US012615542B2

US012615542B2

(12) United States Patent
Ma et al.

(10) Patent No.: US 12,615,542 B2
(45) Date of Patent: Apr. 28, 2026

(54) METHOD AND APPARATUS FOR SUPPORTING DATA TRANSMISSION IN A WIRELESS COMMUNICATION SYSTEM

(71) Applicant: Samsung Electronics Co., Ltd., Suwon-si (KR)

(72) Inventors: Xiaoning Ma, Beijing (CN); Yanru Wang, Beijing (CN); He Wang, Beijing (CN); Hong Wang, Beijing (CN); Lixiang Xu, Beijing (CN); Weiwei Wang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 531 days.

(21) Appl. No.: 18/008,361

(22) PCT Filed: Jun. 18, 2021

(86) PCT No.: PCT/KR2021/007675
§ 371 (c)(1),
(2) Date: Dec. 5, 2022

(87) PCT Pub. No.: WO2021/256893
PCT Pub. Date: Dec. 23, 2021

(65) Prior Publication Data
US 2023/0284076 A1 Sep. 7, 2023

(30) Foreign Application Priority Data

| Jun. 19, 2020 | (CN) | ......................... 202010569082.7 |
| Sep. 28, 2020 | (CN) | ......................... 202011042111.0 |

(51) Int. Cl.
*H04W 28/02* (2009.01)
*H04W 24/02* (2009.01)

(52) U.S. Cl.
CPC ....... *H04W 28/0268* (2013.01); *H04W 24/02* (2013.01)

(58) Field of Classification Search
CPC . H04W 28/0268; H04W 24/02; H04W 76/15; H04W 24/10; H04W 28/02
See application file for complete search history.

(56) References Cited

U.S. PATENT DOCUMENTS

| 10,536,878 B2 | 1/2020 | Jheng et al. |
| 2014/0226508 A1* | 8/2014 | Asplund .............. H04B 7/0626 370/252 |

(Continued)

FOREIGN PATENT DOCUMENTS

| CN | 111224869 A | 6/2020 |
| WO | 2018/171734 A1 | 9/2018 |
| WO | 2020/060234 A1 | 3/2020 |

OTHER PUBLICATIONS

Chinese Office Action dated Dec. 24, 2024, issued in Chinese Application No. 202011042111.0.

(Continued)

*Primary Examiner* — Nicholas A Jensen
*Assistant Examiner* — Ayodele Lawrence Olubodun
(74) *Attorney, Agent, or Firm* — Jefferson IP Law, LLP

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The disclosure provides a method for supporting data transmission, comprising: transmitting, by a first node, (Continued)

a first message including a leg identity and a quality of service (QoS) parameter to a third node; and receiving, by the first node, a second message from the third node; wherein the second message is obtained by the third node based on the first message and a third message for reporting status of transmission leg.

11 Claims, 18 Drawing Sheets

(56)                    References Cited

U.S. PATENT DOCUMENTS

| | | |
|---|---|---|
| 2015/0304865 A1 | 10/2015 | Poscher |
| 2015/0382275 A1 | 12/2015 | Pragada et al. |
| 2018/0109396 A1 | 4/2018 | Hyslop et al. |
| 2018/0124859 A1 | 5/2018 | Cho et al. |
| 2018/0368204 A1 | 12/2018 | Park et al. |
| 2019/0349139 A1* | 11/2019 | Park ........................ H04L 1/189 |
| 2020/0106663 A1* | 4/2020 | Yoo .......................... H04L 67/10 |
| 2020/0169941 A1 | 5/2020 | Chen |
| 2021/0084649 A1* | 3/2021 | Ananth ............. H04W 72/0446 |
| 2021/0195674 A1* | 6/2021 | Park ...................... H04W 76/18 |
| 2021/0195675 A1* | 6/2021 | Park ...................... H04W 88/14 |
| 2021/0298000 A1* | 9/2021 | Park ...................... H04W 72/23 |
| 2023/0014030 A1* | 1/2023 | Li .......................... H04W 76/10 |

OTHER PUBLICATIONS

Zte, (TP for Introduction of NR_IIOT support to TS 38.425) Open issues on DL PDCP duplication, R3-203178, 3GPP tsg_ran\wg3_ iu,tsgr3_108-e, May 22, 2020, Online.
Zte, (Tp for Introduction of NR_IIOT support to TS 38.425) PDCP duplication coordination, R3-201702, 3GPP tsg_ran\wg3_iu, tsgr3_ 107bis_e, Apr. 10, 2020, Online.
Samsung, Support for PDCP Duplication with More than 2 Copies, R3-190433, 3GPP tsg_ran\wg3_iu,tsgr3_103, Feb. 16, 2019, Athens, Greece.
Chinese Office Action dated Aug. 12, 2024, issued in Chinese Application No. 202011042111.0.
Chinese Decision of Rejection dated Apr. 16, 2025, issued in Chinese Patent Application No. 202011042111.0.

* cited by examiner

METHOD AND APPARATUS FOR SUPPORTING DATA TRANSMISSION IN A WIRELESS COMMUNICATION SYSTEM

TECHNICAL FIELD

The present disclosure relates to a mobile communication technology, in particular to a method and device for supporting PDCP duplication transmission in a dual connectivity or carrier aggregation scenario.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Co-ordinated Multi-Points (CoMP), reception-end interference cancellation and the like. In the 5G system, Hybrid FSK and QAM Modulation (FQAM) and sliding window su-perposition coding (SWSC) as an advanced coding modulation (ACM), and filter bank multi carrier (FBMC), non-orthogonal multiple access(NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT en-vironment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

For ultra reliable low latency (URLLC) service, packet data convergence protocol (PDCP) duplication mechanism can guarantee the reliability of wireless communication. This mechanism can be applied to a dual connectivity or carrier aggregation scenario. In a scenario such as dual connectivity or carrier aggregation, etc., a user equipment (UE) can establish wireless connection with the other access node while establishing wireless connection with one access node. The access node may be an eNB or ng-eNB, or may be a gNB or en-gNB. Herein, one node of the access nodes that establish wireless connection with the UE is a Hosting Node (hereinafter, referred to as HN), and the other node is an Assisting Node (hereinafter, referred to as AN). A PDCP entity associated with the UE is located on the HN.

DISCLOSURE OF INVENTION

Technical Problem

An objective of the disclosure is to provide a method and device for supporting PDCP duplication transmission in a dual connectivity or carrier aggregation scenario.

Solution to Problem

According to various embodiments of the present disclosure, there is provided a method for supporting data transmission, comprising: transmitting, by a first node, a first message including a leg identity and a quality of service (QoS) parameter to a third node, wherein the first message may include one or more of: the leg identity, the quality of service (QoS) parameter, and information of PDU session (PDCP Session) enabled with PDCP duplication function; and receiving, by the first node, a second message from the third node; wherein the second message is obtained by the third node based on the first message and a third message for reporting status of transmission legs. The second message may include at least one of: a leg selection scheme, a leg selection strategy, and a leg selection model. Herein, the leg selection scheme can be at least one of: leg that should be selected in HN DU, leg that should not be selected in the HN DU, leg that should be selected in AN DU, leg that should not be selected in the AN DU, leg that should be selected in the HN DU and the AN DU, and leg that should not be selected in the HN DU and the AN DU. The leg selection scheme can also be represented by an identity, wherein a value of the identity represents a corresponding leg selection scheme. The leg selection scheme can also arrange all possible legs in a predetermined way, and for each leg, 1 bit is used to represent whether the leg is selected or not. The leg selection strategy can be a value range of a set of pa-rameters.

According to various embodiments of the present disclosure, the third message includes first information for reporting status of one or more transmission legs of the first node and/or second information for reporting status of one or more transmission legs of the second node.

According to various embodiments of the present disclosure, the third message is received by the third node from the first node, and the second information is obtained based on third information transmitted by the second node to the first node in response to receiving configuration information about reporting the status of the transmission legs from the first node.

According to various embodiments of the present disclosure, the configuration information includes one or more of: a service type, a measurement interval, a reporting period, a start/stop indication, an assistance information type required to be reported, and a leg identity. The configuration information can be transferred through an NR-U information frame or a general packet radio system (GPRS) tunneling protocol en-capsulated user plane data unit (G-PDU) of a new radio radio access network (NR RAN) container, or an inter-node control plane message (such as an Xn interface message, an X2 interface message or a F1 interface message). The NR-U information frame refers to an information frame defined in a new radio user plane protocol (NR User Plane Protocol). The NR-U information frame may be DL USER DATA or a newly defined information frame.

According to various embodiments of the present disclosure, the third information is transmitted through a G-PDU including an NR-U information frame or a new radio radio access network (NR RAN) container.

According to various embodiments of the present disclosure, the NR-U information frame or the NR RAN container includes one or more of: a leg identity, an uplink and/or downlink average resource occupancy rate, an uplink and/or downlink average automatic retransmission request HARQ failure rate, an uplink and/or downlink average HARQ retransmission rate, uplink and/or downlink maximum HARQ retransmission times, uplink and/or downlink RLC maximum retransmission times, uplink and/or an downlink modulation and coding strategy index (MCS index), and a beam identity. The NR-U information frame can be ASSISSTANCE INFORMATION DATA or a newly defined information frame.

According to various embodiments of the present disclosure, the first node is a hosting node or a central unit user plane CU-UP of the hosting node, the second node is an assisting node or a CU-UP of the assisting node, and the third node is a non-real-time RAN intelligent controller (Non-RT RIC) or a decision training entity.

According to various embodiments of the present disclosure, the first information is received from the first node and the second information is received from the second node.

According to various embodiments of the present disclosure, the first node is a hosting node or a distributed unit DU of the hosting node or a central unit user plane CU-UP of the hosting node, and the second node is an assisting node or a DU of the assisting node or a CU-UP of the assisting node.

According to various embodiments of the present disclosure, the third message includes one or more of: a leg identity, an average channel quality index (CQI), average HARQ failure times, average HARQ retransmission times, an uplink and/or downlink radio quality identity, power headroom reporting, an uplink and/or downlink average HARQ failure rate, an uplink and/or downlink average HARQ retransmission rate, an uplink and/or downlink average resource occupancy rate, uplink and/or downlink RLC maximum retransmission times, uplink and/or downlink HARQ maximum retransmission times, an uplink and/or downlink MCS index and a beam identity.

According to various embodiments of the present disclosure, the leg identity is identity of one or more transmission legs currently used by the first node, and the QoS parameter is QoS parameter(s) when communicating on the one or more transmission legs currently used, and the information of the PDU session enabled with PDCP duplication function includes one or more of: a PDU session identity, an identity of QoS flow enabled with the PDCP duplication function, and a QoS parameter of the QoS flow.

According to various embodiments of the present disclosure, there is provided a method for supporting data transmission, comprising: acquiring, by a first node, a leg selection result determined by status information of transmission legs; transmitting, by the first node, a protocol data unit PDCP packet and/or a PDCP duplication packet according to the leg selection result.

According to various embodiments of the present disclosure, the acquiring the leg selection result comprises: generating, by the first node, the leg selection result according to the status information of the transmission legs based on a model about leg selection, or receiving, by the first node, information related to the leg selection from a third node and obtaining the leg selection result based on the information related to the leg selection, wherein the information related to the leg selection is generated by the third node according to the status information of the transmission leg based on the model about leg selection.

According to various embodiments of the present disclosure, the status information of the transmission leg includes the first information about status of one or more transmission legs of the first node and/or the second information about status of one or more transmission legs of a second node.

According to various embodiments of the present disclosure, the second information in the status information of the transmission leg is transmitted by the second node to the first node in response to receiving configuration information about reporting the status of the transmission leg from the first node, or the first node transmits, to the third node, the first information and/or the second information obtained based on third information transmitted by the second node to the first node in response to receiving configuration information about reporting the status of the transmission leg from the first node.

According to various embodiments of the present disclosure, the configuration information includes one or more of: a service type, a measurement interval, a reporting period, a start/stop indication, an assistance information type required to be reported, and a leg identity. The configuration information can be transferred through an NR-U information frame or G-PDU of a new radio radio access network (NR RAN) container, or an inter-node control plane message (such as an Xn interface message, an X2 interface message or a F1 message). The NR-U information frame refers to an information frame defined in a new radio user plane protocol (NR User Plane Protocol). The NR-U information frame can be DL USER DATA or a newly defined information frame.

According to various embodiments of the present disclosure, the second information is transmitted through a G-PDU including an NR-U information frame or a new radio radio access network (NR RAN) container.

According to various embodiments of the present disclosure, the NR-U information frame or the NR RAN container includes one or more of a leg identity, an uplink and/or downlink average resource occupancy rate, an uplink and/or downlink average automatic retransmission request HARQ failure rate, an uplink and/or downlink average HARQ retransmission rate, uplink and/or downlink RLC maximum retransmission times, uplink and/or downlink maximum HARQ retransmission times, an uplink and/or downlink MCS index, and a beam identity. The NR-U information frame may be ASSISSTANCE INFORMATION DATA or a newly defined information frame.

According to various embodiments of the present disclosure, the first node is a hosting node or a central unit user plane CU-UP of the hosting node, the second node is an assisting node or a CU-UP of the assisting node, and the third node is a near-real-time RAN intelligent controller Near-RT RIC or a decision model entity.

According to various embodiments of the present disclosure, the second information is transmitted by the second node to the third node, and the first information is transmitted by the first node to the third node.

According to various embodiments of the present disclosure, the first node is a hosting node or a distributed unit DU of the hosting node or a central unit user plane CU-UP of the hosting node, and the second node is an assisting node or a DU of the assisting node or a CU-UP of the assisting node.

According to various embodiments of the present disclosure, the status information of the transmission leg is transmitted by a message including one or more of: a leg identity, an average channel quality index (CQI), average HARQ failure times, average HARQ retransmission times, an uplink and/or downlink radio quality identity, power headroom reporting, an uplink and/or downlink average HARQ failure rate, an uplink and/or downlink average HARQ retransmission rate, an uplink and/or downlink average resource occupancy rate, uplink and/or downlink RLC maximum retransmission times, uplink and/or downlink HARQ maximum retransmission times, an uplink and/or downlink MCS index and a beam identity.

According to yet another aspect of the present disclosure, there is provided a device for supporting data transmission, comprising: a transceiver configured to transmit and receive signals; a memory configured to store related data, and a processor coupled to the transceiver and the memory and configured to perform the methods according to various embodiments of the present disclosure.

BRIEF DESCRIPTION OF DRAWINGS

FIG. 1 is an exemplary system architecture of system architecture evolution (SAE).

MODE FOR THE INVENTION

FIGS. 1 to 18 discussed below and various embodiments for describing the principles of the present disclosure in this patent document are only for illustration and should not be interpreted as limiting the scope of the disclosure in any way. Those skilled in the art will understand that the principles of the present disclosure can be implemented in any suitably arranged system or device. It should be noted that, as used through the present document, in order to avoid too complicated description, the singular forms with "a," "an," and "the" are intended to include the plural forms as well, unless the context clearly indicates otherwise, and plural forms in some context may also indicate the singular form. Expressions "leg" and "path" used in this document can be used in-terchangeably.

Figure 1:
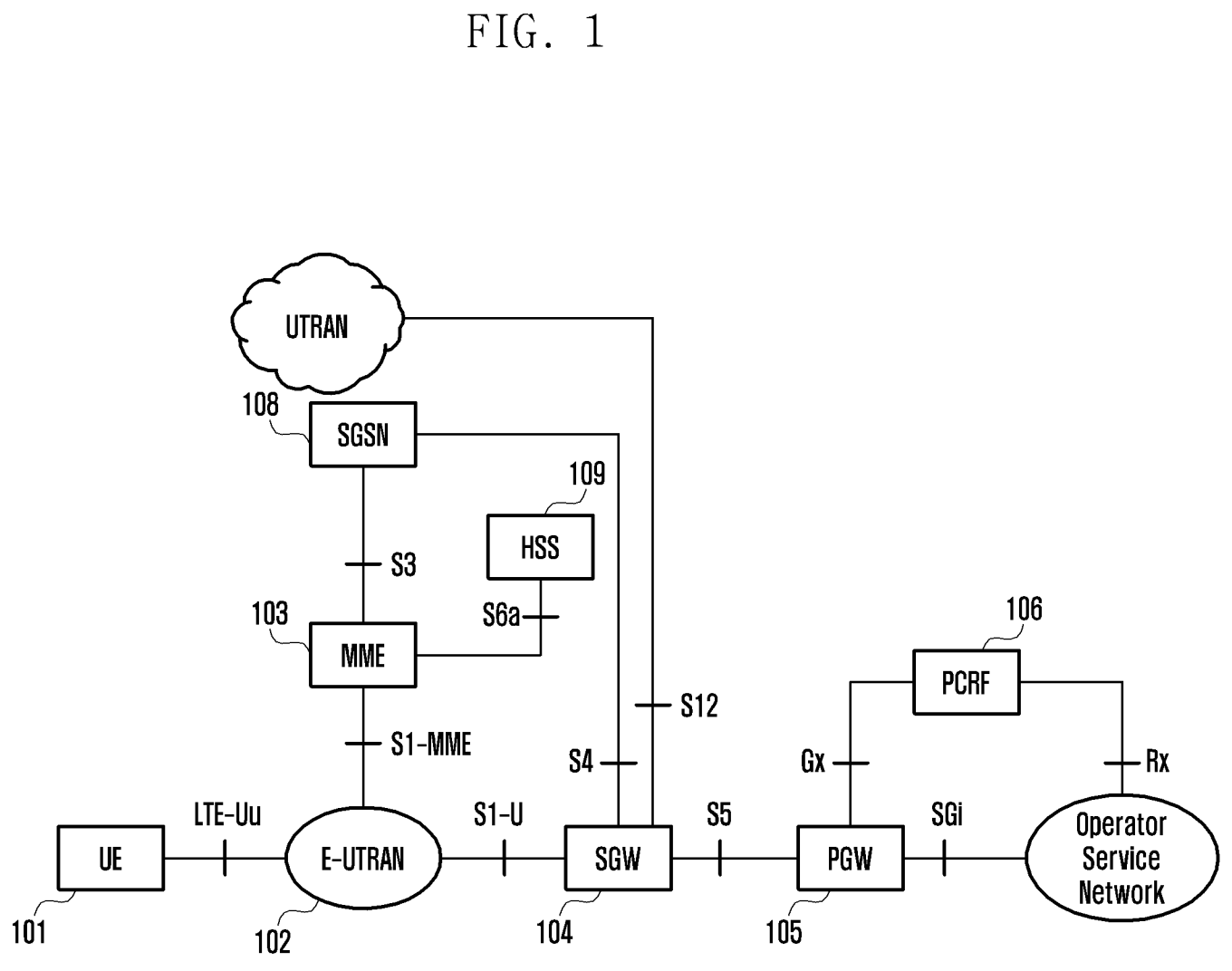

FIG. 1 is an exemplary system architecture 100 of system architecture evolution (SAE). User equipment (UE) 101 is a terminal device for receiving data. An evolved universal terrestrial radio access network (E-UTRAN) 102 is a radio access network, which includes a macro base station (eNodeB/NodeB) that provides UE with interfaces to access the radio network. A mobility management entity (MME) 103 is responsible for managing mobility context, session context and security information of the UE. A serving gateway (SGW) 104 mainly provides functions of user plane, and the MME 103 and the SGW 104 may be in the same physical entity. A packet data network gateway (PGW) 105 is responsible for functions of charging, lawful interception, etc., and may also be in the same physical entity as the SGW 104. A policy and charging rules function entity (PCRF) 106 provides quality of service (QoS) policies and charging criteria. A general packet radio service support node (SGSN) 108 is a network node device that provides routing for data transmission in a universal mobile telecommunications system (UMTS). A home subscriber server (HSS)109 is a home subsystem of the UE, and is responsible for protecting user information including a current location of the user equipment, an address of a serving node, user security information, and packet data context of the user equipment, etc.

Figure 2:
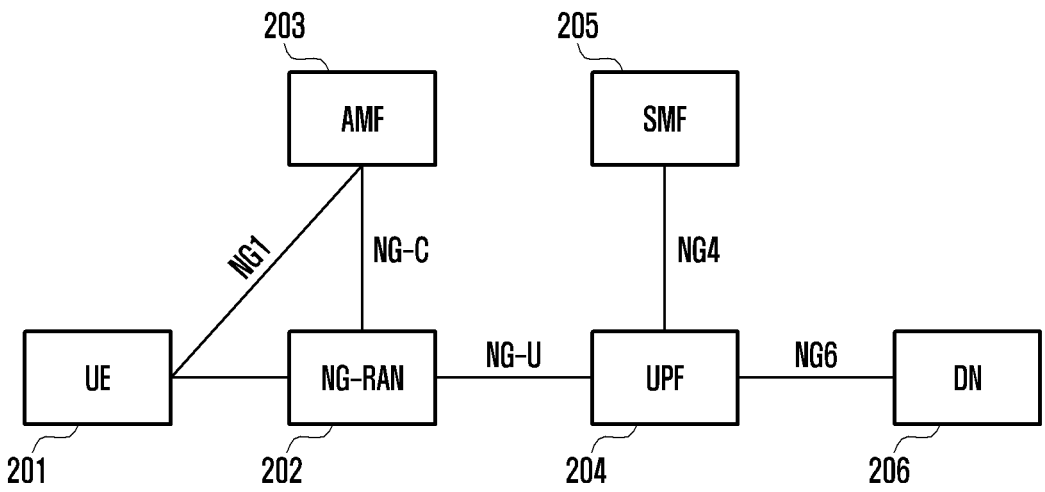
FIG. 2 is an exemplary system architecture according to various embodiments of the present disclosure.

FIG. 2 is an exemplary system architecture 200 according to various embodiments of the present disclosure. Other embodiments of the system architecture 200 can be used without departing from the scope of the present disclosure.

User equipment (UE) 201 is a terminal device for receiving data. A next generation radio access network (NG-RAN) 202 is a radio access network, which includes a base station (a gNB or an eNB connected to 5G core network 5GC, and the eNB connected to the 5GC is also called ng-gNB) that that provides UE with interfaces to access the radio network. An access control and mobility management function entity (AMF) 203 is responsible for managing mobility context and security information of the UE. A user plane function entity (UPF) 204 mainly provides functions of user plane. A session management function entity SMF 205 is responsible for session management. A data network (DN) 206 includes, for example, services of operators, access of Internet and service of third parties.

The present disclosure involves that, in a dual connectivity or carrier aggregation scenario, when PDCP duplication transmission is supported, the access node or other entity in the network acquires the channel transmission conditions on respective Radio Legs/Paths in multiple access nodes, so as to support the data transmission on the radio legs better.

Figure 3:
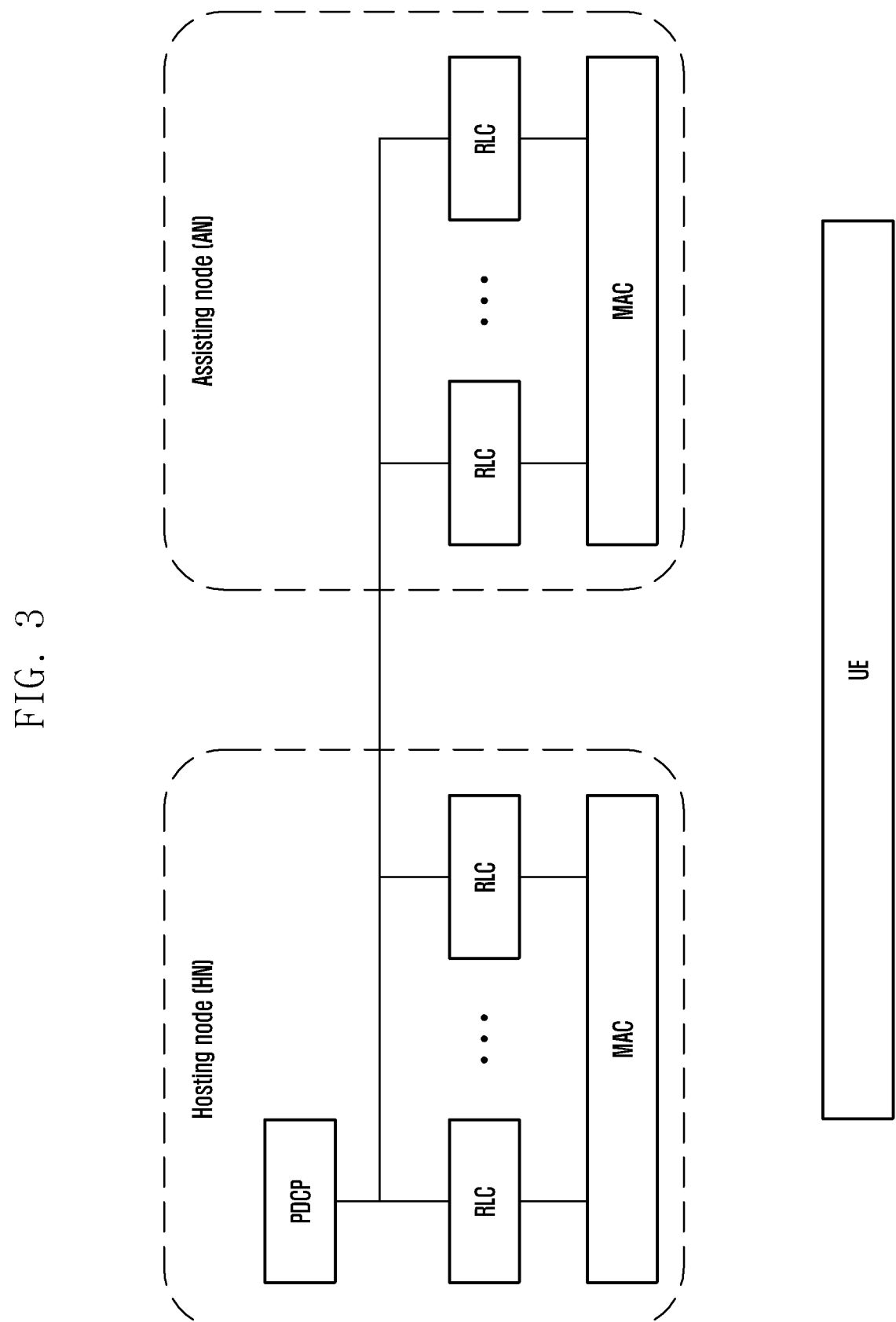
FIG. 3 is an exemplary schematic diagram of a system in which a UE establishes wireless connections with different access nodes at the same time according to various embodiments of the present disclosure.

FIG. 3 is an exemplary schematic diagram of a system in which a UE establishes wireless connections with different access nodes at the same time according to various embodiments of the present disclosure.

In the HN and the AN, multiple radio legs can be configured for PDCP duplication packet transmission. The number of the configured radio legs can be, for example, 4. Because the channel transmission conditions and available resources on each radio leg are different, and the actual conditions of duplicate packets transmission on different radio legs are different as time changes. In addition, the actual conditions of transmission legs in turn affect the effect of data transmission. Thus, how to interact the transmission leg conditions among different network entities is an urgent problem to be solved.

In view of this, the present disclosure provides a method and device for supporting data transmission in a mobile communication network. According to the method and/or device, the access node or other entities can acquire the conditions of the respective radio legs on multiple access nodes, so as to support the data transmission on the radio legs better.

The present disclosure provides a method and device for supporting data transmission in a mobile communication network. With the method and/or device, data transmission on the radio legs can be better supported by increasing or facilitating singalling interaction between the HN and the AN, the HN and/or the AN and a decision training entity and/or a decision entity.

According to the embodiment of the present disclosure, the information about the status of the respective transmission legs of the nodes can be transmitted through the G-PDU in the form of assistance information data. For example, the information of the status of the respective transmission legs of the AN can be transmitted to the HN by the AN through the G-PDU, or the information of the status of the respective transmission legs of the AN or the HN can be transmitted to a corresponding CU-UP (central unit user plane) of the AN or the HN by the a DU (distributed unit) of the AN or the HN. According to the embodiment of the present disclosure, the transmission of the above-mentioned information of the transmission leg status can be better supported by adding one or more fields in the NR RAN container of the G-PDU.

In addition, according to an embodiment of the present disclosure, a message for reporting the transmission leg status (e.g., a leg report, Leg Report) may be adopted to transfer the transmission leg status of the nodes between nodes and/or entities. For example, the transferring of the transmission leg status information between the nodes and/or the entities can be realized through a message including one or more related fields. In an implementation, for example, the information on the status of the respective transmission legs of the AN or the HN can be transmitted to the corresponding CU-CP (central unit-control plane) of the AN or the HN by the CU-UP (central unit-user plane) of the AN or the HN, or the status report for the respective transmission legs of the AN or the HN can be transferred between the HN or the HN DU or the HN CU-UP or the HN CU-CP or the AN or the AN DU or the AN CU-UP or the AN CU-CP and an entity for performing decisions and/or an entity for training required models (hereinafter referred to as a decision entity and/or a decision training entity) through this message. It should be understood that the names of various entities, messages or information described in this disclosure are only exemplary, and are not intended to be limiting. Instead, these names can be changed according to actual situations or naming conventions, etc., and all these changes are included in the scope of this disclosure.

A method according to various embodiments of the present disclosure includes one or more of the following aspects:

(1) A message for notifying reporting requirements of Assistance Information is added to the Xn interface between NG-RAN nodes or the X2 interface between eNBs, or the F1 interface between a gNB CU and a gNB DU or the E1 interface between the gNB CU-UP and a gNB CU-CP. In one implementation, for example, the message can be an assistance information reporting configuration message. According to an embodiment of the disclosure, the message may include, but is not limited to, one or more of the following: a service type, a window size, a reporting interval, a start/end indication, a type of assistance information required to be reported, and a leg identity.

\* A service type field is used for the HN to inform the AN of a service type or parameter type that needs to be reported, herein, the service type can be used to determine the parameter type that needs to be reported in assistance information.

\* Type of assistance information required to be reported field can include but is not limited to: an average CQI, average HARQ failure times, average HARQ retransmission times, an uplink and/or downlink radio quality index, power headroom reporting, an uplink and/or downlink average HARQ failure rate, an uplink and/or downlink average HARQ retransmission rate, an uplink and/or downlink average resource occupancy rate, an uplink and/or downlink MCS index, uplink and/or downlink RLC maximum retransmission times, uplink and/or downlink HARQ retransmission times and a beam identity. Herein, the resource occupancy rate can be, but is not limited to, average number of occupied PRBs, and/or ratio of the average number of the occupied PRBs to the total number of PRBs, and/or ratio of the average number of occupied PRBs to the number of idle PRBs.

The expression ways of the type of assistance information required to be reported can include but not limited to that:

** It is represented by a multi-bit field, where each bit corresponds to an assistance information type. When a certain bit is set to 1, it is required to report corresponding assistance information type in the leg status report; or when a certain bit is set to 0, it is required to report the corresponding assistance information type in the leg status report.

** It is represented by an identity, herein, a value of the identity represents that it is required to report a set of corresponding assistance information type in the leg status report.

* A window size field is used for the HN to inform the AN of a measurement interval for the reported assistance information so as to obtain the average value of measurement parameter. This field can also be used to inform the measurement interval of the reported assistance information between the nodes. The node may be an access node, and/or a CU of the access node, and/or a CU-CP of the access node, and/or a CU-UP of the access node, and/or a DU of the access node. Herein, the measured parameter may include, but is not limited to, an average CQI on a transmission leg, uplink and/or downlink average HARQ failure times, uplink and/or downlink average HARQ retransmission times, power headroom reporting, an uplink/downlink radio quality identity, an uplink and/or downlink average HARQ failure rate, an uplink and/or downlink average HARQ retransmission rate, an uplink and/or downlink average resource occupancy rate, uplink and/or downlink RLC maximum retransmission times, uplink and/or downlink HARQ maximum retransmission times, an uplink/downlink MCS index and beam identity, and other information specified in the service type field or the assistance information type. The window size can be commonly configured for all assistance information types required to be reported, or can be configured separately for each type of assistance information required to be reported. The window size may, for example, be determined by one or more of: a service type, QoS requirements, an assistance information type required to be reported, HN implementation, or implementation of other nodes.

* The reporting interval field can be used for the HN to inform the AN whether the way of transmitting Assistance Information Data is periodic transmission, and in the case of the periodic transmission, it is specifically an interval of the periodic transmission of the assistance information data. That is, if the transmission mode of the assistance information data is the periodic transmission, the interval for reporting the assistance information is the interval indicated by the reporting interval; if the transmission mode of the assistance information data is aperiodic transmission, the reporting interval is a default value, and the default value can be, for example, but not limited to, an all-zero field or determined by a HN/AN implementation. The reporting interval field can also be used to inform, for example, a node who receives a message of reporting requirements of the assistance information whether the transmission mode of a leg status report is periodic or not, and in the case of the periodic transmission, the interval of the periodic transmission of the leg status report is indicated. That is, if the transmission mode of the leg status report is periodic transmission, the interval of reporting is the interval indicated by the reporting interval; if the transmission mode of the leg status report is aperiodic transmission, the reporting interval is a default value, and the default value can be, for example, but not limited to: an all-zero field. The reporting interval can be commonly configured for all assistance information types required to be reported, or can be configured separately for each type of assistance information required to be reported. The reporting interval can, for example, be determined by one or more of: a service type, QoS requirements, an assistance information type required to be reported, HN implementation, or implementation of other nodes.

* A start/end indication field is used for the HN to inform the AN to start or stop the transmission of the assistance information data. The start/end indication field can also be used to inform, for example, a node who receives a message of reporting requirements of the assistance information, to start or stop the transmission of the leg status report. The start/end indication can be represented by using 1 bit, for example, this bit being 1 represents to start reporting the leg status report, and this bit being 0 represents to stop reporting the leg status report; or this bit being 0 represents to start reporting the leg status report, and this bit being 1 represents to stop reporting the leg status report.

* A leg identity. The leg identity is used to indicate the leg required to report the status. The leg identity can be, for example, but not limited to, a logical channel identity (LC ID) used by the leg, and/or an identity of a data forwarding channel between a first node and a second node, and/or an identity of a cell or a cell group of the second node, herein, the first node or the second node is, for example, the first node and the second node shown in FIG. 4. The identity of the data forwarding channel may be a transport layer address and/or a GPRS tunneling protocol tunnel endpoint identifier (GTP-TEID).

(2) A field indicating a leg identify (Leg/leg ID) is added to the NR RAN container of the G-PDU to identify a leg. This field can be, for example, but not limited to, a logical channel identity, or a node ID+a path code (the path code can be configured by the node to which the path belongs, or a random number), or random numbers that are different from each other, or configured by the hosting node, or configured by the node to which the path belongs. The NR RAN container may include assistance information data.

(3) A field indicating the uplink and/or downlink average resource occupancy rate is added in the NR RAN container of the G-PDU, which is used for the assisting node AN to transmit the average resource occupancy rate of a single leg to the hosting node HN. The field can be/represent the average number of occupied PRBs of the leg, or the ratio of the average number of the occupied PRBs to the total number of PRBs, or the ratio of the average number of occupied PRBs to the number of idle PRBs. This field is optional. The NR RAN container may include assistance information data.

(4) A field indicating an uplink and/or downlink average HARQ failure rate is added in the NR RAN container of the G-PDU, which is used for the AN to transmit the average HARQ failure rate of a single leg to the hosting node. The field may be the ratio of the value of the field "average HARQ failure times" to the number of packets transmitted, or the average number of the ratio of HARQ failure times to the number of packets transmitted. The NR RAN container may include assistance information data.

(5) A field indicating an uplink and/or downlink average HARQ retransmission rate is added in the NR RAN container of the G-PDU, which is used for the AN to transmit the average HARQ retransmission rate of a single leg to the hosting node. The field can be/represent the ratio of the value of a field "average HARQ retransmission times" to the number of packets transmitted, or the average number of the ratios of HARQ retransmission times to the number of packets transmitted. The NR RAN container may include assistance information data.

(6) A field indicating uplink and/or downlink RLC maximum retransmission times and/or uplink and/or downlink HARQ maximum retransmission times is added in the NR RAN container of the G-PDU, which is used for the AN to transmit the uplink and/or downlink RLC maximum retransmission times and/or uplink and/or downlink maximum HARQ retransmission times of a single leg to the hosting node. The NR RAN container may include assistance information data.

(7) A field indicating an uplink and/or downlink MCS index is added in the NR RAN container of the G-PDU, which is used for the AN to transmit the uplink and/or downlink MCS index to the hosting node. The NR RAN container may include assistance information data.

(8) A message for reporting the related conditions of the currently used leg(s) in nodes, which is communicated between the HN or the HN CU-UP or other nodes and the decision entity and/or decision training entity (for example, a data radio bearer report (DRB Report)) is added, to inform identity of the currently used transmission leg and PDCP QoS parameter of service related to the currently used transmission leg. The node can be an access node, and/or a CU of the access node, and/or a CU-CP of the access node, and/or a CU-UP of the access node, and/or a DU of the access node. The message may include, but is not limited to, one or more of: an identity of the currently used transmission leg (Selected Radio Leg ID), PDCP QoS. The message can be a message in Xn or X2 or O2 or E2. The message may include, but is not limited to, one or more of the following information:

* An identity of the currently used transmission leg, which represents an identity of the currently used or the selected leg in the HN or the HN CU-UP, or an identity of the currently used or selected leg for PDCP duplication. The identity of the currently used transmission leg can also be expressed by an identity, a value of the which represents a corresponding leg selection scheme, or all possible legs are arranged in a predetermined way, and for each leg, 1 bit is used to represent whether the leg is selected or not.

* PDCP QoS represents QoS when communicating on the currently used or selected leg(the QoS including, but not limited to, the transmission delay of PDCP packets, a packet loss rate of PDCP packets, etc.).

* Information about PDU sessions enabled with PDCP duplication function. The information includes, but is not limited to, one or more of: a PDU session identity, an identity of QoS flow enabled with PDCP duplication function, and a QoS parameter of the QoS flow.

(9) A message for reporting status of the transmission leg, which is communicated between the HN or the HN DU or the AN or the AN DU or other nodes and the decision entity and/or decision training entity or other nodes (for example, a leg status report (Leg Report)) is added. The node can be an access node, and/or a CU of the access node, and/or a CU-CP of the access node, and/or a CU-UP of the access node, and/or a DU of the access node. The message includes, but is not limited to, one or more of leg identity, average CQI, uplink and/or downlink average HARQ failure times, uplink and/or downlink average HARQ retransmission times, uplink and/or downlink radio quality identity (Radio Quality Index), power headroom reporting, uplink and/or downlink average HARQ failure rate, uplink and/or downlink average HARQ retransmission rate, an uplink and/or downlink average resource occupancy rate, uplink and/or downlink RLC maximum retransmission times, uplink and/or downlink HARQ maximum retransmission times, uplink/downlink MCS index and beam identity. The average resource occupancy rate is an optional field. The message can be a message in Xn or X2 or E1 or F1.

(10) A message for informing information about leg selection (for example, a leg selection scheme, a leg selection strategy Leg Selection, a leg selection model), which is communicated between the HN or the AN or the HN DU or the AN DU or the HN CU-UP or the AN CU-UP or other nodes and the decision entity or other nodes is added, to inform the access point of the leg selection strategy and/or the information about the leg selection. The node can be an access node, and/or a CU of the access node, and/or a CU-CP of the access node, and/or a CU-UP of the access node, and/or a DU of the access node. If the number of selected legs is greater than one, it represents that PDCP duplication mechanism is activated; if the number of selected legs is equal to one, it represents that the PDCP duplication mechanism is not activated. The message may indicate, for example, but not limited to, one or more of: legs that should be selected in HN DU, legs that should not be selected in the HN DU, legs that should be selected in AN DU, legs that should not be selected in the AN DU, legs that should be selected in the HN DU and the AN DU, and legs that should not be selected in the HN DU and the AN DU. The message may also indicate an identity, wherein a value of the identity represents a corresponding leg selection scheme. The message can also arrange all possible legs in a predetermined way, and for each leg, 1 bit is used to represent whether the leg is selected or not. The message can be a message in Xn or X2 or E1 or F1.

(11) A decision training entity is an entity for collecting data and obtaining decision model based on the collected data, while a decision entity is an entity for deploying decision models and obtaining a leg selection strategy based on the decision models. These two entities can be nested in the O-RAN architecture. Herein, the decision training entity is deployed in non-real-time RAN intelligent controller (Non-RT RIC) or other nodes or deployed separately, and the decision entity is deployed in near-real-time RAN intelligent controller (Near-RT RIC) or other nodes or deployed separately. The node can be an access node, and/or a CU of the access node, and/or a CU-CP of the access node, and/or a CU-UP of the access node, and/or a DU of the access node.

(12) A message for reporting the related conditions of the legs currently used in the nodes (e.g., a DRB Report) is added, which is communicated between HN or HN CU-UP and Non-RT RIC or Near-RT RIC messages in the O-RAN architecture. The message may include, for example, but not limited to, one or more of: an identity of the currently used transmission leg (Selected Radio Leg IDs), a PDCP QoS. The identity of the currently used transmission leg is the leg ID currently used or selected in the hosting node. PDCP QoS is QoS when communicating on the currently used or selected leg (the QoS including, but not limited to, delays, packet loss rates, etc.).

(13) A message for reporting transmission leg status (e.g., a leg status report (Leg Report)), which is communicated between the HN or the HN DU or the AN or AN DU and Non-RT RIC or Near-RT RIC in the O-RAN architecture is added. The message may include, for example, but not limited to one or more of: a leg identity, an average CQI, average HARQ failure times, average HARQ retransmission times, an uplink and/or downlink radio quality identity, power headroom reporting, an average HARQ failure rate, an average HARQ retransmission rate, an average resource occupancy rate, maximum HARQ retransmission times, and an uplink/downlink MCS index. The average resource occupancy rate is an optional field.

(14) A message for transferring the trained decision model about the path selection RIC (e.g., a trained decision model (Trained Model)), which is communicated between Non-RT RIC and Near-RT is added for the Non-RT RIC to transmit the trained decision model to the Near-RT RIC. A message for transferring the trained decision model about the leg selection (e.g., a trained decision model (Trained Model)), which is communicated between the decision training entity and the decision entity is added, for the decision training entity to transmit the trained decision model to the decision entity.

(15) A message for indicating PDCP duplication mechanism (e.g., a PDCP duplication indication), which is communicated between the HN CU-UP or the HN CU-CP or the HN or other nodes and the Near-RT RIC or the decision entity in the O-RAN architecture or between other nodes is added, for the Near-RT RIC or the decision entity to inform the HN CU-UP or the HN CU-CP or the HN of the decision on whether to enable PDCP duplication. The node can be an access node, and/or a CU of the access node, and/or a CU-CP of the access node, and/or a CU-UP of the access node, and/or a DU of the access node.

(16) Configuration information for leg status reporting is added in the NR-U information frame. The NR-U information frame may be DL USER DATA or a newly defined information frame. According to embodiments of the present disclosure, the configuration information may include, but is not limited to, one or more of the following information:

* A type of assistance information required to be reported. The type of assistance information can include but is not limited to: an average CQI, uplink and/or downlink average HARQ failure times, uplink and/or downlink average HARQ retransmission times, an uplink and/or downlink radio quality index, power headroom reporting, an uplink and/or downlink average HARQ failure rate, an uplink and/or downlink average HARQ retransmission rate, an uplink and/or downlink average HARQ resource occupancy rate, an uplink and/or downlink MCS index, uplink and/or downlink RLC maximum retransmission times, uplink and/or downlink HARQ retransmission times and a beam identity. Herein, the resource occupancy rate can be, but is not limited to, the average number of occupied PRBs, and/or a ratio of the average number of the occupied PRBs to the total number of PRBs, and/or a ratio of the average number of occupied PRBs to the number of idle PRBs.

The expression ways of the type of assistance information required to be reported may include but is not limited to:

** representing by a multi-bit field, where each bit corresponds to an assistance information type. When a certain bit is set to 1, it is required to report the corresponding assistance information type in leg status report; or when a certain bit is set to 0, it is required to report the corresponding assistance information type in leg status report.

** representing by an identity, herein, a value of the identity represents that a set of corresponding assistance information types are required to report in the leg status report.

* A window size for informing of a measurement interval for reporting the assistance information so as to obtain an average value of the measured parameter. Herein, the measured parameter may include, but is not limited to, an average CQI, average HARQ failure times, average HARQ retransmission times, an uplink and/or downlink average HARQ failure rate, an uplink and/or downlink average HARQ retransmission rate, an uplink and/or downlink average resource occupancy rate, an uplink and/or downlink MCS index, uplink and/or downlink RLC maximum retransmission times, uplink and/or downlink HARQ maximum retransmission times and a beam identity on the transmission leg. The window size can be commonly configured for all assistance information types required to be reported, or can be configured separately for each type of assistance information required to be reported. The window size may, for example, be determined by one or more of: the type of assistance information required to be reported, QoS requirements, or an implementation.

* A reporting interval, which may be used to inform whether the transmission of a leg status report is periodic or not, and in the case of the periodic transmission, an interval of the periodic transmission of the leg status report is indicated. That is, if the transmission mode of the leg status report is periodic transmission, an interval of reporting is an interval indicated by the reporting interval; if the transmission mode of the leg status report is aperiodic transmission, the reporting interval is a default value, and the default value can be, for example, but not limited to: an all-zero field, or determined by an implementation of the HN/AN. The reporting interval can be commonly configured for all assistance information types required to be reported, or can be configured separately for each type of assistance information required to be reported. The reporting interval may be determined by, for example, one or more of: a type of assistance information required to be reported, QoS requirements, or an implementation.

* A start/end indication, which is used for informing to start or stop the reporting of the leg information. The start/end indication can be represented by using 1 bit, for example, this bit being 1 represents to start to report the leg status report, and this bit being 0 represents to stop reporting the leg status report; or this bit being 0 represents to start to report the leg status report, and this bit being 1 represents to stop reporting the leg status report.

* A leg identity. The leg identity is used to indicate the leg required to report a status report. The leg identity can be, but not limited to, logical channel identity LC ID used by the leg, and/or the identity of data forwarding channel between a first node and a second node, and/or one the identity of a cell or a cell group of the second node, herein, the first node or the second node is, for example, the first node and the second node shown in FIG. 4. The identity of the data forwarding channel may be a transport layer address, and/or GTP-TEID, and/or a number or name configured by a node to which the leg belongs.

(17) Leg status report information is added in the NR-U information frame. The NR-U information frame can be ASSISSTANCE INFORMATION DATA or can be a newly defined information frame. The leg status report information may include one or more of: an average CQI, uplink and/or downlink average HARQ failure times, uplink and/or downlink average HARQ retransmission times, an uplink and/or downlink radio quality index, power headroom reporting, an uplink and/or downlink average HARQ failure rate, an uplink and/or downlink average HARQ retransmission rate, an uplink and/or downlink average resource occupancy rate, an uplink and/or downlink MCS index, uplink and/or downlink RLC maximum retransmission times, uplink and/or downlink HARQ maximum retransmission times and a beam identity. The beam identity may be a SSB index or a CSI-RS index.

(18) Downlink leg selection scheme information is added, which is used for an access node or a DU of the access node to inform the UE of the downlink leg selection scheme, so that the UE does not need to monitor whether there is downlink data on all possible downlink legs, thus achieving the purpose of saving energy for the UE. This information can be contained in MAC CE or RRC message. This information contains one or more of the following information:

\* A DRB ID, which is an identity of DRB using PDCP duplication function of the UE.

\* An transmission direction indication, indicating whether the indicated leg is an uplink leg or a downlink leg. The transmission direction indication can be expressed by 1 bit, for example, this bit being 1 represents an uplink leg, and this bit being 0 represents a downlink leg; or this bit being 0 represents an uplink leg, and this bit being 1 represents a downlink leg.

\* A leg selection scheme, which can be represented by identity of the selected legs, or can be represented by an identity, a value of which represents a corresponding leg selection scheme, or all possible legs are arranged in a predetermined way, and for each leg, 1 bit is used to represent whether the leg is selected or not. Illustrate the last expression way for example. For example, a total of three legs can be used for the downlink legs of PDCP duplication, the leg indexes of which are 1, 2, and 3, respectively, and it is agreed by the implementation that all legs are arranged in ascending order of the indexes, and the first leg is selected, which is represented as 1, while the other two legs are not selected, which is represented as 0, then the leg selection scheme is represented by 3 bits and the value is binary 100.

(19) An indication of the uplink and/or downlink leg selection scheme is added in the NR-U information frame, so that an access node or a DU of the access node informs the UE of the leg selection decision. The NR-U information frame can be DL USER DATA or can be a newly defined information frame. The expression way of an uplink and/or downlink leg selection result can be as follows:

\* 2 bits are used to represent the selection result of the current leg, herein, one bit represents whether the uplink selects the current leg, while the other bit represents whether the downlink selects the current leg. Another expression is that one bit represents whether it is uplink or downlink. If 0 represents the uplink, 1 represents the downlink, and vice versa; and the other bit represents whether to select the current leg. If 1 represents to select, 0 represents not to select, and vice versa.

\* 4 bits are used to represent the selection result of the current leg, herein, 2 bits represent the uplink and 2 bits represent the downlink. In the 2 bits representing uplink or downlink, one bit represents whether to select the current leg. If 1 represents to select, 0 represents not to select, and vice versa. The other bit represents whether the aforementioned bit information is valid, for which 1 represents to be valid, 0 represents to be invalid, or vice versa. If this bit indicates that the aforementioned bit is invalid, the content of the aforementioned bit should be ignored.

\* 2\*N bits are used to represent the selection results of N legs, of which 2 bits represent one leg. The 2-bit representation method can be the same as the 2-bit representation of the current leg selection result.

The uplink and/or downlink leg selection scheme can also be contained in an inter-node control plane message, such as an Xn interface or an X2 interface or an E1 interface or an F1 interface.

(20) A message for informing information about leg selection (for example, a leg selection strategy (Leg Selection)), which is communicated between the HN or the AN or the HN DU or the AN DU or the HN CU-UP or the AN CU-UP and the Near-RT RIC in the O-RAN Architecture, is added, to inform the access node of the leg selection strategy. If the number of selected legs is greater than one, it represents that PDCP duplication mechanism is activated; if the number of selected legs is equal to one, it represents that the PDCP duplication mechanism is not activated. The message may include, for example, but not limited to, one or more of: legs that should be selected in HN DU, legs that should not be selected in the HN DU, legs that should be selected in AN DU, legs that should not be selected in the AN DU, legs that should be selected in the HN DU and the AN DU, and legs that should not be selected in the HN DU and the AN DU. The message can be a message in Xn or X2.

Exemplary embodiments of the present disclosure are further described below with reference to the accompanying drawings in details.

It should be understood that the embodiments and drawings of the present disclosure are provided as examples only to help understand the present disclosure. They should not be interpreted as limiting the scope of the present disclosure in any way. Although certain embodiments and examples have been provided, it will be apparent to those skilled in the art that various changes may be made to the illustrated embodiments and examples without departing from the scope of the present disclosure, based on the disclosure herein.

The present disclosure provides a method for supporting data transmission in a mobile communication network. In order to better help those skilled in the art to understand this disclosure, the following is a further detailed description of this disclosure with reference to the drawings and in combination with exemplary embodiments. It should be understood that the following description is only exemplary, and is not intended to be any limitation, nor is it intended to indicate the best mode. All schemes that can be thought of by those skilled in the art according to the example embodiments of this disclosure and the disclosure of the drawings are within the scope of this disclosure.

The hosting node HN may be included in an example communication network according to an embodiment of the present disclosure. A hosting node HN contains NR PDCP interacts with AN, and serves as a node providing radio connection service for the UE. The hosting node HN may be, for example, but not limited to, gNB or eNB, or en-gNB, or ng-eNB. An assisting node AN may be further included in an example communication network according to an embodiment of the present disclosure. The assisting node AN does not contain NR PDCP, interacts with HN, and can also serve as a node providing radio connection service for the UE. The assisting node AN may be, for example, but not limited to, gNB or eNB, or en-gNB, or ng-eNB.

The method for supporting data transmission according to the embodiment of the present disclosure involves that a second node in a communication network reports status of each transmission leg of the second node to a first node. Herein, for example, the first node may be HN, and the second node may be AN. Or the first node may be a CU-UP of an access node, and the second node may be a DU of a same or different access node. Or the first node may be an access node or a CU-UP of the access node, and the second node may be a CU-UP of a different access node or a different access node.

Figure 4:
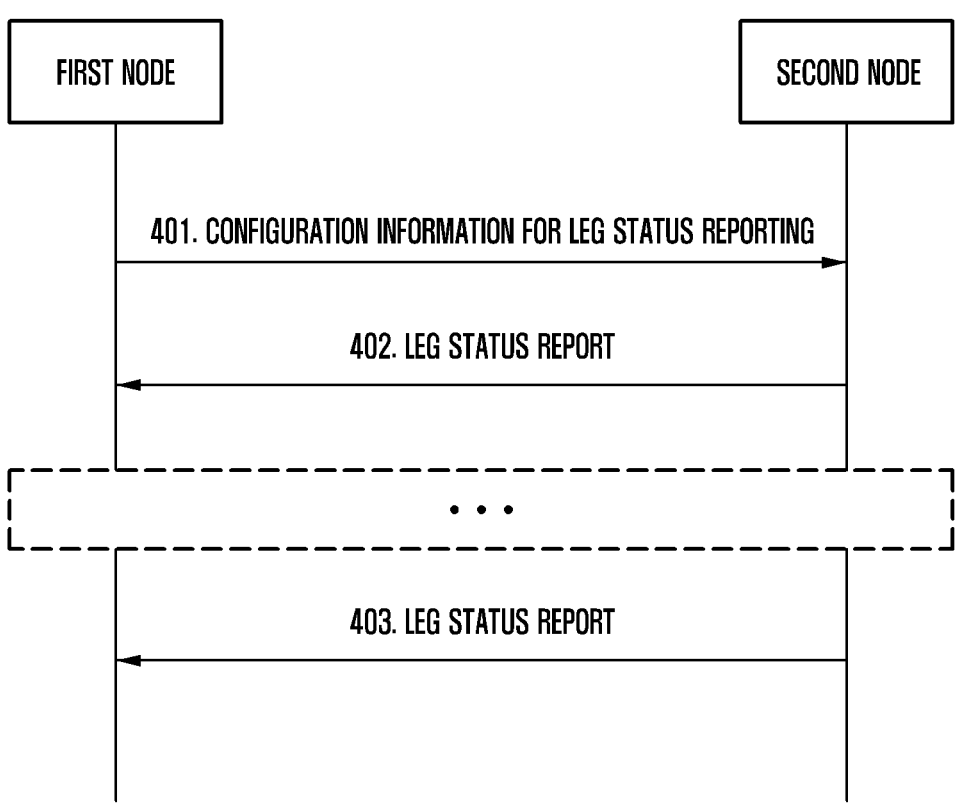
FIG. 4 illustrates a schematic diagram of one aspect of a method for supporting data transmission according to an embodiment of the present disclosure.

FIG. 4 illustrates a schematic diagram of one aspect of a method for supporting data transmission according to one embodiment of the present disclosure. As shown in FIG. 4, the method comprises the following steps:

In step 401, a first node transmits an Xn message assistance information reporting configuration to a second node. The message includes configuration information for leg status reporting. The configuration information may also be transmitted in an NR-U information frame, which may be DL USER DATA or a newly defined NR-U information frame. The message or the configuration information may include, but is not limited to, one or more of: a service type, a window size, a reporting interval, a start/end indication, a type of assistance information required to be reported, and a leg identity.

The message is used to inform the service type or the reporting parameter type, a window size of AN for measurement, and/or the reporting interval, and/or the start/end reporting indication.

In step 402, the second node transmits a message including a status report for each transmission leg to the first node. In an implementation, for example, the message may be a G-PDU including assistance information data. The AN transmits information about each transmission leg of the AN to HN via the message. The leg status report may also be transmitted in an NR-U information frame, which may be ASSISTANCE INFORMATION DATA or may be a newly defined NR-U information frame. According to various embodiments of the present disclosure, the status report of the transmission leg may be reported by, for example, but not limited to: the aforementioned message for reporting the status of the transmission leg (for example, a leg status report (Leg Report)) or assistance information data included in the G-PDU. In an implementation, the AN reports the status report of the transmission leg to the HN through the assistance information data. In another implementation, AN DU/HN DU reports the status report of the transmission leg to AN CU-UP/HN CU-UP through the assistance information data. In another implementation, the CU-UP reports the leg status report to the CU-CP through the E1 interface.

The leg status report may include one or more of: an average CQI, an uplink and/or downlink average HARQ failure times, uplink and/or downlink average HARQ retransmission times, an uplink and/or downlink radio quality index, power headroom reporting, an uplink and/or downlink average HARQ failure rate, an uplink and/or downlink average HARQ retransmission rate, an uplink and/or downlink average resource occupancy rate, an uplink and/or downlink MCS index, uplink and/or downlink RLC maximum retransmission times, uplink and/or downlink HARQ maximum retransmission times and a beam identity. The beam identity may be a SSB index or a CSI-RS index.

Herein, the second node generates and transmits the leg status report according to the configuration information received in step 401.

Herein, if a reporting interval in the assistance information reporting configuration message in step 401 indicates that it is periodic reporting, the method further proceeds to step 403, that is, when the reporting period indicated by the reporting interval is met, the second node continues to periodically report the status report for each transmission leg, which is similar to the step 402, so its details are omitted to avoid obscuring this disclosure.

In addition, if the indication in the assistance information reporting configuration message in step 401 is that it is aperiodic reporting, the method ends after step 402.

Figure 5:
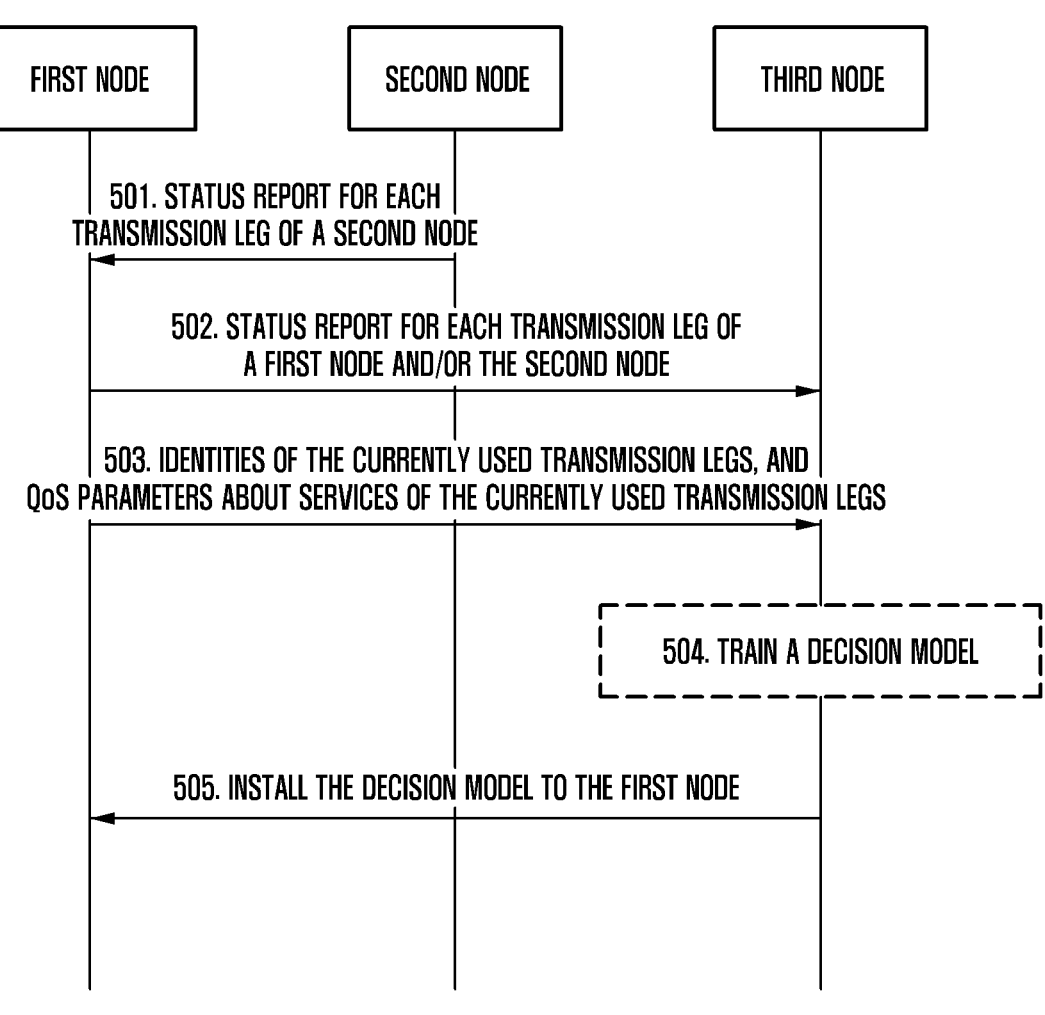
FIG. 5 illustrates a schematic diagram of one aspect of a method for supporting data transmission in a mobile communication network according to an embodiment of the present disclosure.

FIG. 5 illustrates a schematic diagram of one aspect of a method for supporting data transmission in a mobile communication network according to an embodiment of the present disclosure. Specifically, FIG. 5 illustrates a schematic diagram of a method in which a third node trains by using information transmitted by a first node when UE accesses to different access nodes (the first node and a second node). In an implementation, for example, the first node may be HN, the second node may be AN, and the third node may be a decision training entity.

It should be noted that the third node can be located at different positions according to different actual application scenarios. For example, in an implementation, the third node may be located in the first node. For another example, in another implementation, the third node may be in other locations, for example, but not limited to, in the core network, etc. It should be noted that the location of the third node may be arranged according to actual application scenarios, all of which are within the scope of the present disclosure.

As shown in FIG. 5, the method comprises the following steps:

In step 501, the second node transmits a message including a status report for each transmission leg of the second node to the first node. In an implementation, for example, the message may be a G-PDU including assistance information data. In an implementation in which the first node is a HN and the second node is an AN, the AN can transmit the information of the status of each transmission leg in the AN to the HN via the message.

In step 502, the first node transmits a message including a status report for each transmission leg of the first node and/or the second node to the third node. In an implementation, for example, the message may be the aforementioned message for reporting the status of the transmission leg (for example, a leg status report (Leg Report)). It should be noted that this is only an example, and the message used by the first node to transmit the status report for each transmission leg in the first node and/or the second node in this step may also be other messages.

In step 503, the first node transmits to the third node a message including an identity of the currently used transmission leg (for example, a Selected Radio Leg ID), and/or a PDCP QoS parameter of current transmission service based on the used transmission leg, and/or information about PDU sessions enabled with PDCP duplication function. In an implementation, for example, the message may be a DRB Report. It should be noted that this is only an example, and the message used by the first node in this step to transmit a message including the identity of the currently used transmission leg and the PDCP QoS parameter for current transmission service based on the used transmission leg may also be another message.

At step 504, the third node obtains leg information and QoS information according to the status report about each transmission leg, the identity of the currently used transmission leg and the information about the PDCP QoS parameter of the current transmission service based on the used transmission leg received from the first node, and trains a decision model by using the obtained leg information and the QoS information.

In step 505, the third node installs the trained decision model to the first node. In an implementation, the third node installs the trained decision model to the first node by transmitting a message to the first node. For example, the message may be the aforementioned message for transferring the trained decision model about leg selection (e.g., the trained decision model (Trained Model)). It should be noted that this message can also be other message. It should also be noted that the third node can also install the trained decision model to the first node in other ways. For example, in another non-limiting example, the trained decision model can also be installed to the first node in a form similar to the installing of software.

In addition, the above-mentioned step 503 may be performed before step 501 or step 502, or may be performed substantially simultaneously with step 501 or step 502.

Figure 6:
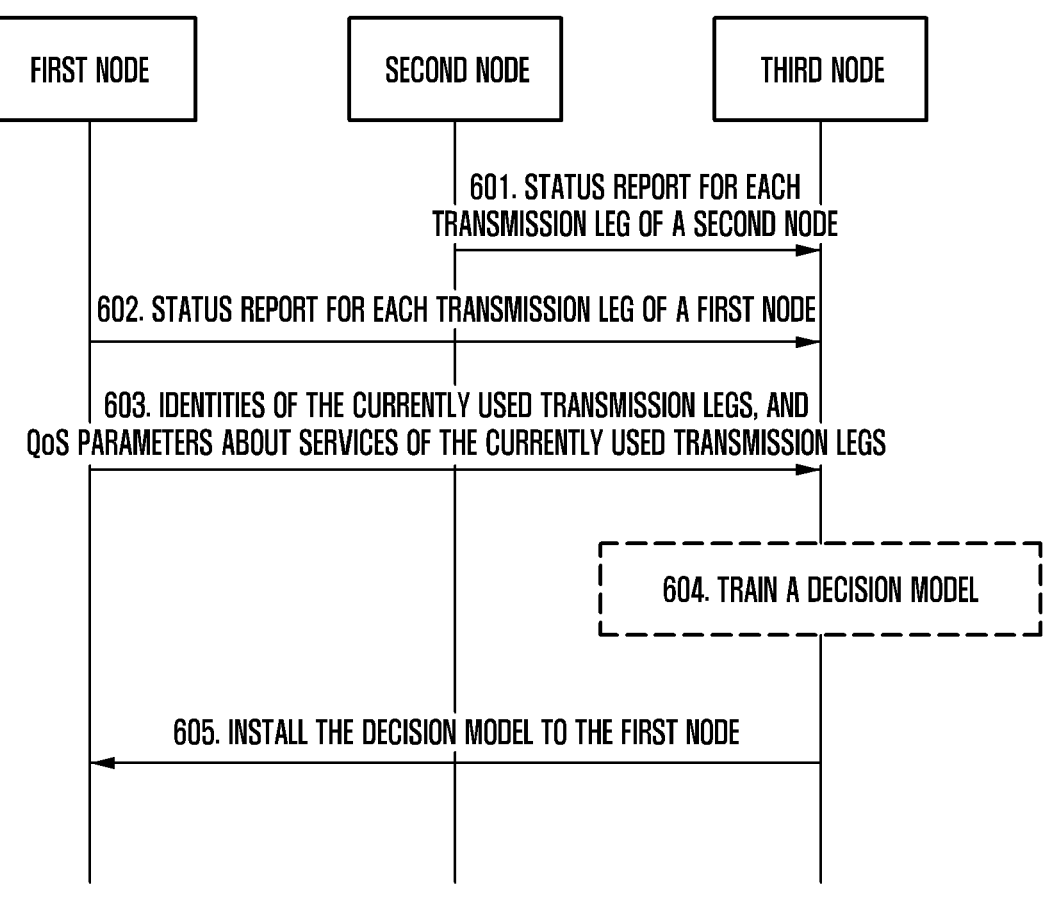
FIG. 6 illustrates a schematic diagram of one aspect of a method for supporting data transmission in a mobile communication network according to an embodiment of the present disclosure.

FIG. 6 illustrates a schematic diagram of one aspect of a method for supporting data transmission in a mobile communication network according to an embodiment of the present disclosure. Specifically, FIG. 6 illustrates a schematic diagram of a method in which a third node trains by using information transmitted by a first node and a second node in a case where UE accesses to different access nodes (the first node and a first node). In an implementation, for example, the first node may be HN, the second node may be AN, and the third node may be a decision training entity.

It should be noted that the third node can be located at different positions according to different actual application scenarios. For example, in an implementation, the third node may be located in the first node. For another example, in another implementation, the third node may be in other locations, for example, but not limited to, in the core network, etc. It should be noted that the location of the third node may be arranged according to actual application scenarios, all of which are within the scope of the present disclosure.

As shown in FIG. 6, the method comprises the following steps:

In step 601, the second node transmits a message including a status report for each transmission leg of the second node to the third node. In an implementation, for example, the message may be the aforementioned message for reporting the status of the transmission leg (for example, a leg status report (Leg Report)).

In step 602, the first node transmits a message including a status report for each transmission leg of the first node to the third node. In an implementation, for example, the message may be the aforementioned message for reporting the status of the transmission leg (for example, a leg status report (Leg Report)).

In step 603, the first node transmits to the third node a message including an identity of the currently used transmission leg (for example, a Selected Radio Leg ID), and/or information about the PDCP QoS parameter (for example, PDCP QoS) of current transmission service based on the used transmission leg, and/or information about PDU sessions enabled with PDCP duplication function. In an implementation, for example, the message may be a DRB Report.

At step 604, the third node obtains leg information and QoS information according to the status report about each transmission leg received from the first node and the second node, the identity of the currently used transmission leg and the information about the PDCP QoS parameter of the current transmission service based on the used transmission leg received from the first node, and trains a decision model by using the obtained leg information and the QoS information.

In step 605, the third node installs the trained decision model to the first node. In an implementation, the third node installs the trained decision model to the first node by transmitting a message to the first node. For example, the message may be the aforementioned message for transferring the trained decision model about leg selection (e.g., the trained decision model (Trained Model)). It should be noted that this message can also be another message. It should also be noted that the third node can also install the trained decision model to the first node in other ways. For example, in another non-limiting example, the trained decision model can also be installed to the first node in a form similar to the installing of software.

In addition, the sequence of the above step 601, step 602 and step 603 is only exemplary and is not intended to be limiting. On the contrary, the performing order of step 601, step 602, and step 603 can be arbitrarily exchanged, or can be basically performed at the same time.

Figure 7:
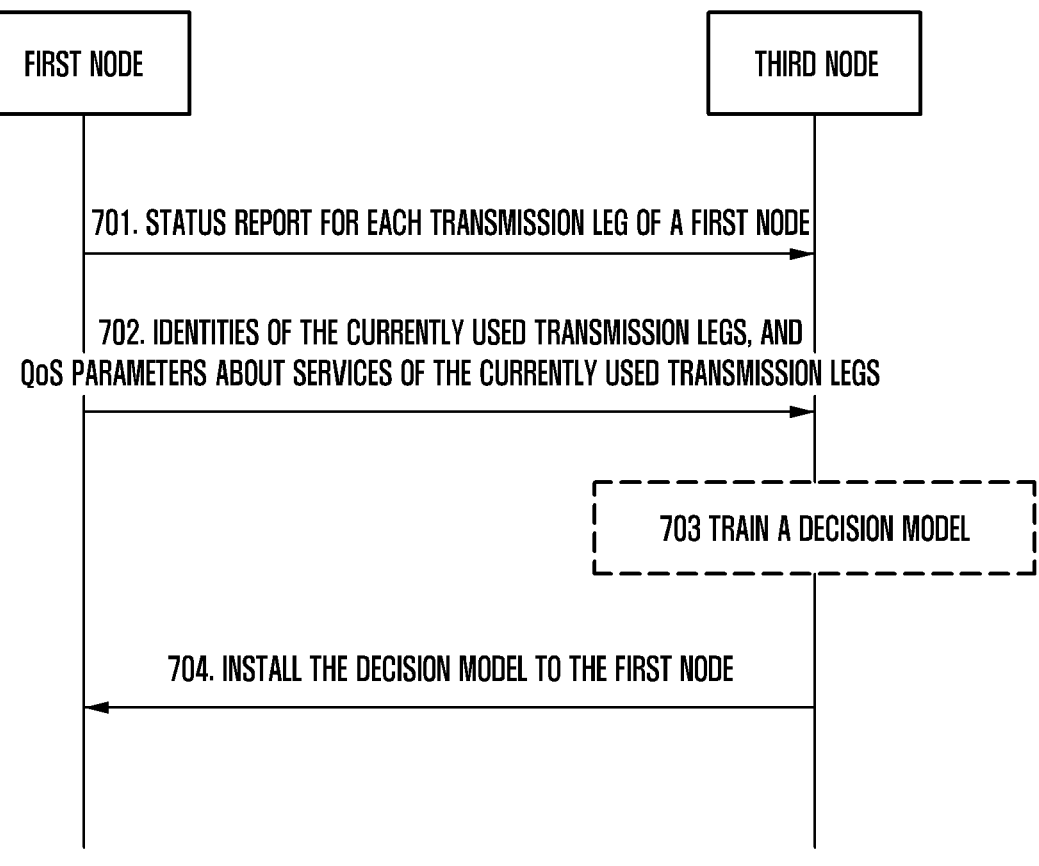
FIG. 7 illustrates a schematic diagram of one aspect of a method for supporting data transmission in a mobile communication network according to an embodiment of the present disclosure.

FIG. 7 illustrates a schematic diagram of one aspect of a method for supporting data transmission in a mobile communication network according to an embodiment of the present disclosure. Specifically, FIG. 7 illustrates a schematic diagram of a method in which a third node trains by using information transmitted by a first node in a case where UE accesses to an access node (the first node). In an implementation, for example, the first node may be a HN/AN, and the third node may be a decision training entity.

It should be noted that the third node can be located at different positions according to different actual application scenarios. For example, in an implementation, the third node may be located in the first node. For another example, in another implementation, the third node may be in other locations, for example, but not limited to, in the core network, etc. It should be noted that the location of the third node may be arranged according to actual application scenarios, all of which are within the scope of the present disclosure.

As shown in FIG. 7, the method comprises the following steps:

In step 701, the first node transmits a message including a status report for each transmission leg of the first node to the third node. In an implementation, for example, the message may be the aforementioned message for reporting the status of the transmission leg (for example, a leg status report (Leg Report)).

In step 702, the first node transmits to the third node a message including an identity of the currently used transmission leg (for example, a Selected Radio Leg ID), and/or information about the PDCP QoS parameter (for example, PDCP QoS) of current transmission service based on the used transmission leg, and/or information about PDU sessions enabled with PDCP duplication function. In an implementation, for example, the message may be the aforementioned message for reporting the related state of the leg currently used in the node (for example, a DRB report).

At step 703, the third node obtains leg information and QoS information according to the status report about each transmission leg, the identity of the currently used transmission leg and the information about the PDCP QoS parameter of the current transmission service based on the used transmission leg received from the first node, and trains a decision model by using the obtained leg information and the QoS information.

In step 704, the trained decision model is installed to the first node. In an implementation, the third node installs the trained decision model to the first node by transmitting a message to the first node. For example, the message may be the aforementioned message for transferring the trained decision model about leg selection (e.g., the trained decision model (Trained Model)). It should be noted that this message can also be other message. It should also be noted that the third node can also install the trained decision model to the first node in other ways. For example, in another non-limiting example, the trained decision model can also be installed to the first node in a form similar to the installing of software.

In addition, the sequence of the above step 701 and step 702 is only exemplary and is not intended to be limiting. On the contrary, the performing order of step 701, and step 702 can be arbitrarily exchanged, or can be basically performed at the same time.

Figure 8:
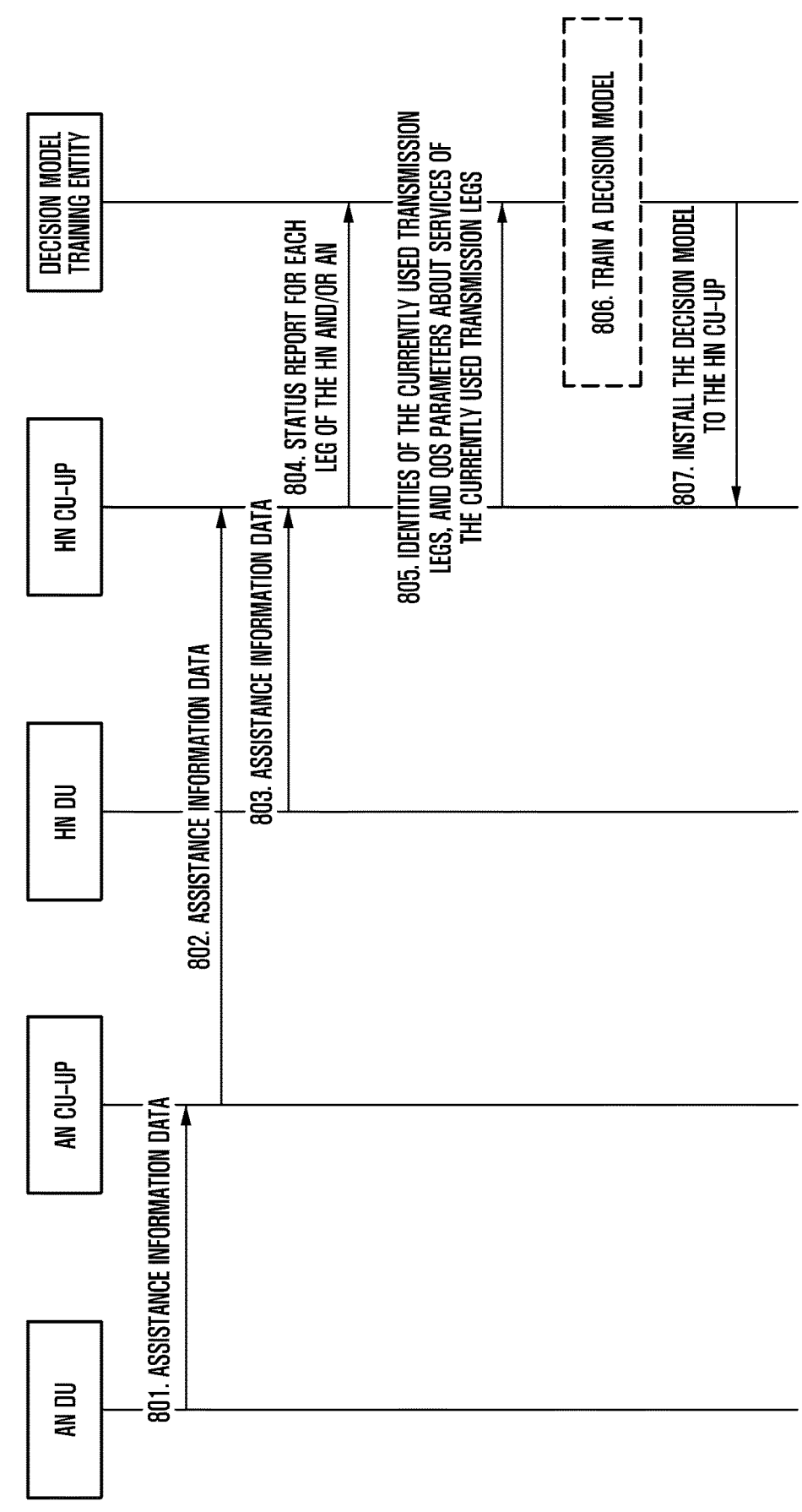
FIG. 8 illustrates a schematic diagram of one aspect of a method for supporting data transmission in a mobile communication network according to an embodiment of the present disclosure.

FIG. 8 illustrates a schematic diagram of one aspect of a method for supporting data transmission in a mobile communication network according to an embodiment of the present disclosure. Specifically, FIG. 8 illustrates a schematic diagram of a process in which a decision training entity trains through information received from HN under the condition of split function of a HN and an AN.

As shown in FIG. 8, the method comprises the following steps:

In step 801, an AN DU transmits a message to an AN CU-UP, and the message may be a G-PDU including assistance information data. The AN DU transmits information about each leg in the AN DU to the AN CU-UP via the message.

In step 802, the AN CU-UP transmits a message to a HN CU-UP, and the message may be a G-PDU including assistance information data. The AN CU-UP transmits information about each leg in the AN DU to the HN via the message.

In step 803, a HN DU transmits a message to the HN CU-UP, and the message may be a G-PDU including assistance information data. The HN DU transmits information about each leg in the HN DU to the HN CU-UP via the message.

In step 804, the HN CU-UP transmits a message to a decision training entity. In an implementation, for example, the message may be the aforementioned message for reporting the status of the transmission leg (for example, a leg status report (Leg Report)). The HN CU-UP transmits the information about each leg of the HN DU or/and the AN DU to the decision training entity via the message.

In step 805, the HN CU-UP transmits a message including an identity of the currently used transmission leg (for example, a Selected Radio Leg ID) and a PDCP QoS parameter of current transmission service based on the used transmission leg to the decision training entity. In an implementation, for example, the message may be the aforementioned message for reporting the related condition of the leg currently used in the node (for example, a DRB report).

In step 806, the decision training entity obtains leg information and QoS information according to the message received from the HN CU-UP, and trains the decision model by using the obtained leg information and the QoS information.

At step 807, the trained decision model is installed to the HN CU-UP. In an implementation, the decision training entity transmits a message to the HN CU-UP to install the trained decision model to the HN CU-UP. For example, the message may be the aforementioned message for transferring the trained decision model about leg selection (e.g., the trained decision model (Trained Model)). It should be noted that this message can also be other message. It should also be noted that the trained decision model can be installed to the HN CU-UP in other ways. For example, in another non-limiting example, the trained decision model can also be installed to the HN CU-UP in a form similar to the installing of software.

It should be noted that the above sequence of steps is only exemplary. For example, step 803 may be performed before step 802 or step 801, or step 803 may be performed substantially simultaneously with step 802 or step 801, and step 805 may be performed before step 804.

Figure 9:
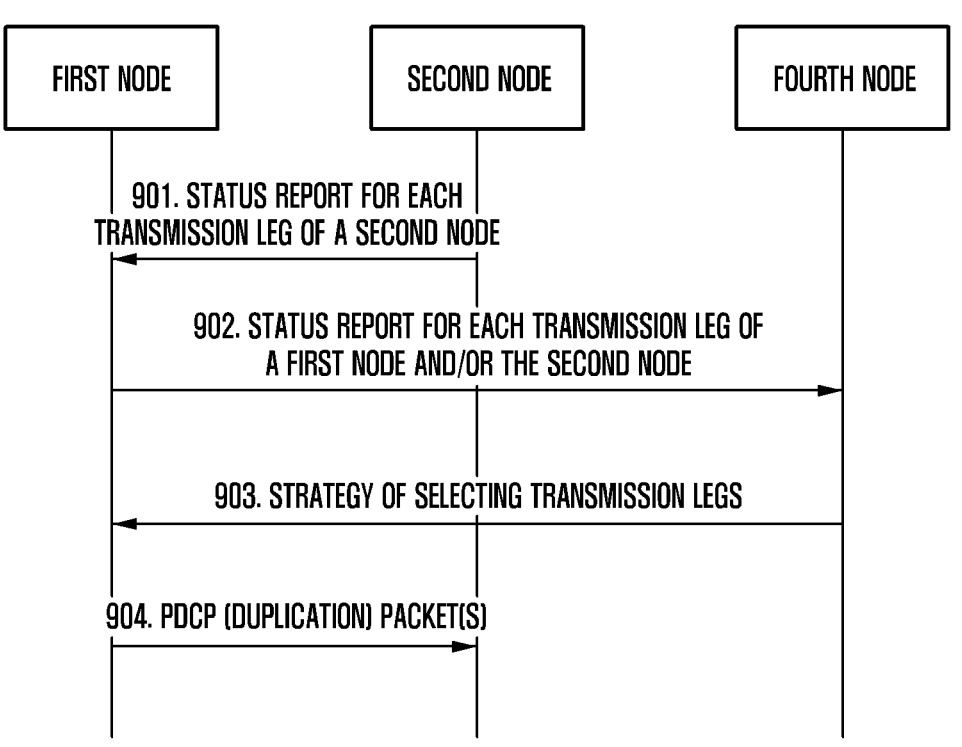
FIG. 9 illustrates a schematic diagram of one aspect of a method for supporting data transmission in a mobile communication network according to an embodiment of the present disclosure.

FIG. 9 illustrates a schematic diagram of one aspect of a method for supporting data transmission in a mobile communication network according to an embodiment of the present disclosure. Specifically, FIG. 9 illustrates a schematic diagram of a process in which a fourth node installed with a decision model performs leg selection using information transmitted by a first node in a case where the UE accesses to different access nodes (the first node and a second node). In an implementation, for example, the first node may be HN, the second node may be AN, and the fourth node may be a decision training entity.

As shown in FIG. 9, the method comprises the following steps:

In step 901, the second node transmits a message including a status report for each transmission leg of the second node to the first node. The message may be a G-PDU including assistance information data. For example, an AN may transmit information about each leg of the AN to a HN via the message.

In step 902, the first node transmits a message including a status report for each transmission leg of the first node and/or the second node to the fourth node. In an implementation, for example, the message may be the aforementioned message for reporting the status of the transmission leg (for example, a leg status report (Leg Report)). For example, the first node (e.g., the HN) reports each leg information of the first node and/or the second node (e.g., the AN) to the fourth node via the message.

In step 903, the fourth node (e.g., a decision entity) transmits a message including a strategy about selecting transmission legs to the first node. In an implementation, for example, the message may be the aforementioned message for notifying information about leg selection (e.g., a leg selection strategy (Leg Selection)). The message is used to inform the HN of a leg selected by the fourth node (e.g., the decision entity). In an implementation, the message may indicate one or more of: legs that should be selected in the HN and/or the AN, and legs that should not be selected in the HN and/or the AN.

In step 904, the first node selects the transmission legs of the first node and/or the second node based on the received message of the strategy about selecting the transmission legs, and transmits PDCP packets and/or PDCP duplication packets to the second node according to the selected transmission legs.

It should be noted that in step 904, if only one transmission leg is selected based on the received strategy about selecting the transmission legs, only PDCP packets are transmitted on the selected transmission leg without transmitting the PDCP duplication packets. And if more than one transmission legs are selected based on the received strategy about selecting the transmission legs, the PDCP packets and the PDCP duplication packets are transmitted on the selected transmission legs.

Figure 10:
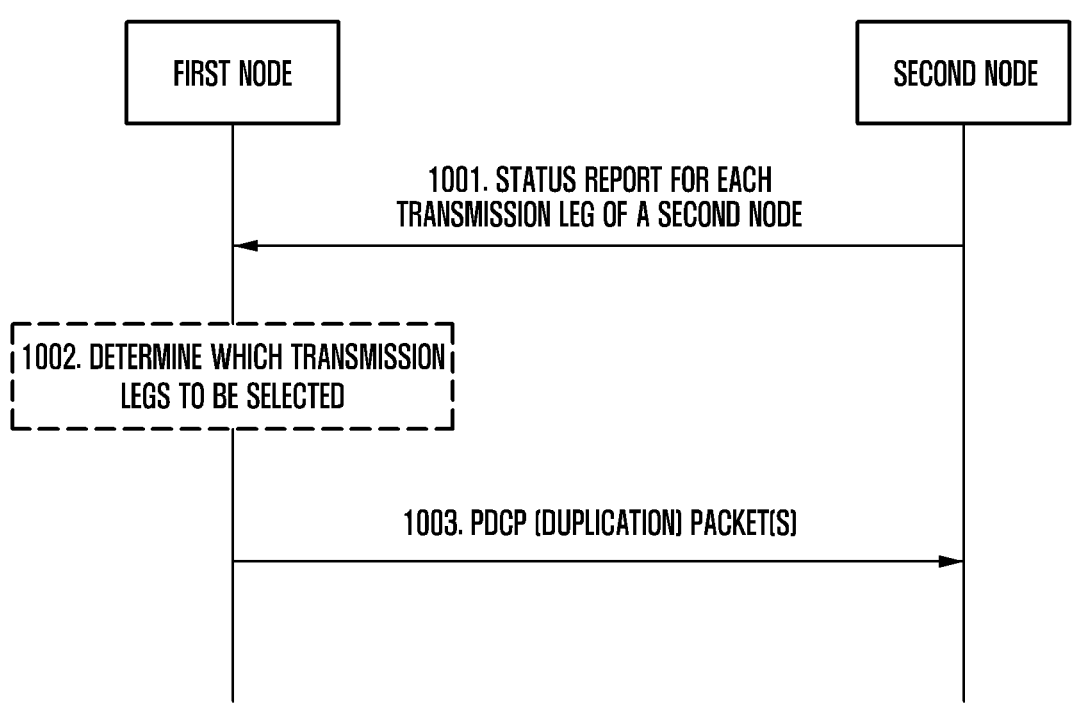
FIG. 10 illustrates a schematic diagram of one aspect of a method for supporting data transmission in a mobile communication network according to an embodiment of the present disclosure.

FIG. 10 illustrates a schematic diagram of one aspect of a method for supporting data transmission in a mobile communication network according to an embodiment of the present disclosure. Specifically, FIG. 10 illustrates that a first node installed with a decision model performs leg selection using information transmitted by a second node and its own information in a case where UE accesses to different access points (the first node and the second node). In an implementation, for example, the first node may be a HN and the second node may be an AN.

As shown in FIG. 10, the method comprises the following steps:

In step 1001, the second node transmits a message including a status report for each transmission leg of the second node to the first node. The message may be a G-PDU including assistance information data. The second node (e.g., the AN) transmits information about each leg in the second node to the first node (e.g., the HN) via the message.

In step 1002, the first node performs leg selection according to the information transmitted by the second node and its own transmission leg information based on the decision model.

In step 1003, the first node transmits PDCP packets and/or PDCP duplication packets to the second node according to the selected legs.

It should be noted that in step 1003, if there is only one selected leg, the first node only transmits the PDCP packets on the selected leg. If there are more than one selected legs, the first node transmits the PDCP packets and the PDCP duplication packets on the selected legs.

Figure 11:
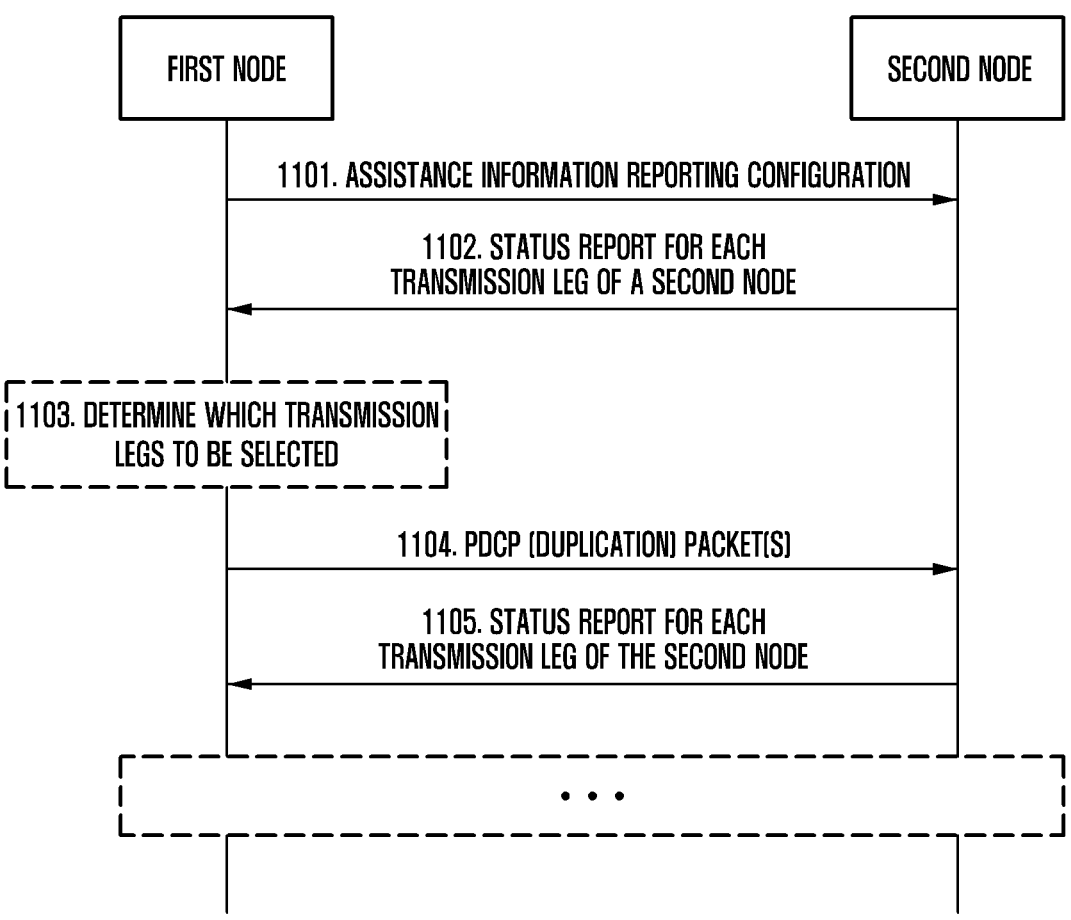
FIG. 11 illustrates a schematic diagram of one aspect of a method for supporting data transmission in a mobile communication network according to an embodiment of the present disclosure.

FIG. 11 illustrates a schematic diagram of one aspect of a method for supporting data transmission in a mobile communication network according to an embodiment of the present disclosure. Specifically, FIG. 11 illustrates that a first node installed with a decision model can initiate a second node reporting mechanism according to the PDCP QoS information on currently transmitted service of the transmission leg currently used by the first node, and perform leg selection based on information reported by the second node and its own information, in a case where UE accesses to different access points (the first node and the second node). In an implementation, for example, the first node may be HN and the second node may be an AN.

As shown in FIG. 11, the method comprises the following steps:

In step 1101, the first node can initiate a second node reporting mechanism according to the above QoS information, and transmits Xn message assistance information reporting configuration to the second node, herein, the message may include, but is not limited to, one or more of: a service type, a window size, a reporting interval, a start/end indication, a type of assistance information required to be reported, and a leg identity. The message is used to inform of one or more of: a service type or reporting parameter type, a window size for measurement of the AN, and/or a reporting interval, and/or a start/end reporting indication. In step 1102, the second node transmits a message including a status report for each transmission leg of the second node to the first node. The message may be a G-PDU including assistance information data. The second node (e.g., the AN) transmits information about each leg in the second node to the first node (e.g., the HN) via the message.

In step 1103, the first node performs leg selection according to the information transmitted by the second node and its own leg information based on the decision model.

In step 1104, the first node transmits PDCP packets and/or PDCP duplication packets to the second node according to the selected legs.

It should be noted that in step 1104, if there is only one selected leg, the first node only transmits the PDCP packets on the selected leg. If there are more than one selected legs, the first node transmits the PDCP packets and the PDCP duplication packets on the selected legs. In addition, if a reporting interval in the assistance information reporting configuration message in step 1101 indicates that it is periodic reporting, the second node will periodically report a status report for each transmission leg according to an interval indicated by the reporting interval after the method proceeds to step 1105.

Figure 12:
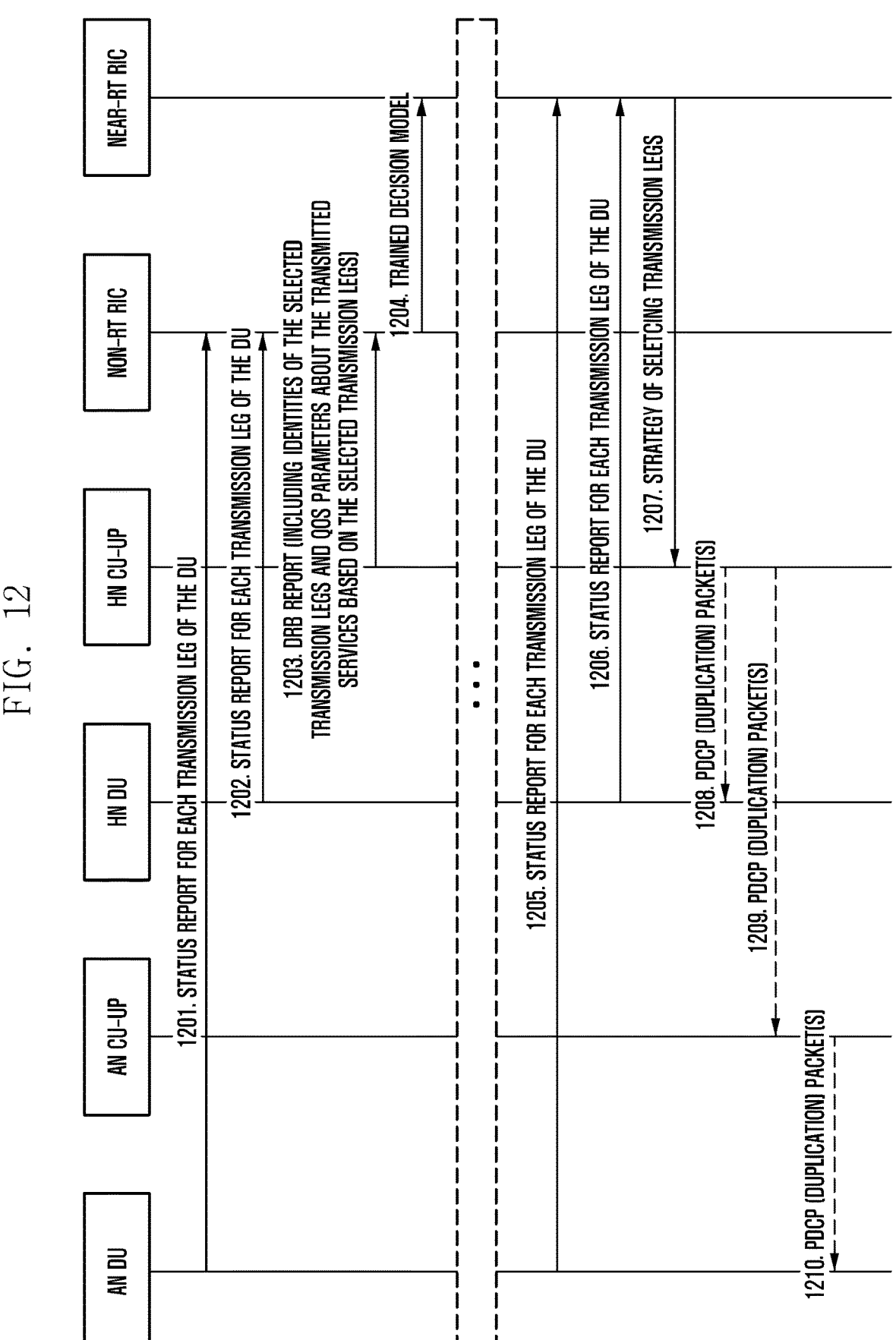
FIG. 12 illustrates a schematic diagram of one aspect of a method for supporting data transmission in a mobile communication network according to an embodiment of the present disclosure.

FIG. 12 illustrates a schematic diagram of one aspect of a method for supporting data transmission in a mobile communication network according to an embodiment of the present disclosure. Specifically, FIG. 12 illustrates that in a case where a decision entity and/or a decision training entity are nested in the O-RAN architecture, a Non-RT RIC is used as the decision training entity to train based on information transmitted by a HN and an AN, and a Near-RT RIC is used as the decision entity to perform leg selection based on the information transmitted by the HN and the AN.

As shown in FIG. 12, the method comprises the following steps:

In step 1201, an AN DU transmits a message including a status report for each transmission leg of the AN DU to the Non-RT RIC. In an implementation, for example, the message may be the aforementioned message for reporting the status of the transmission leg (for example, a leg status report (Leg Report)).

In step 1202, a HN DU transmits a message including a status of each transmission leg of the HN DU to the Non-RT RIC. In an implementation, for example, the message may be the aforementioned message for reporting the status of the transmission leg (for example, a leg status report (Leg Report)).

In step 1203, a HN CU-UP transmits a message including a DRB status to the Non-RT RIC, where the DRB status includes, but is not limited to, the identity of the transmission leg currently used by the HN and PDCP QoS parameter related to current transmission service based on the used transmission leg. In an implementation, for example, the message may be the aforementioned message for reporting the related condition of the leg currently used in the node (for example, a DRB report).

In step 1204, the Non-RT RIC transmits the trained decision model to the Near-RT RIC with a message. In an implementation, for example, the message may be the aforementioned message for transferring the trained decision model about leg selection (e.g., the trained decision model (Trained Model)).

Thereafter, the method may proceed to step 1205 and continue as follows:

In step 1205, the AN DU transmits a message including a status report for each transmission leg of the AN DU to the Near-RT RIC. In an implementation, for example, the message may be the aforementioned message for reporting the status of the transmission leg (for example, a leg status report (Leg Report)).

In step 1206, the HN DU transmits a message including a status of each transmission leg of the HN DU to the Near-RT RIC. In an implementation, for example, the message may be the aforementioned message for reporting the status of the transmission leg (for example, a leg status report (Leg Report)).

In step 1207, the Near-RT RIC obtains a transmission leg selection strategy by using information in the received message based on the decision model, and transmits the transmission leg selection strategy to the HN CU-UP with a message. In an implementation, for example, the message may be the aforementioned message for notifying information about leg selection (e.g., a leg selection strategy (Leg Selection)). The message is used to inform the HN CU-UP of a leg decision, which may indicate one or more of: legs that should be selected in the HN DU and/or the AN DU, and legs that should not be selected in the HN DU and/or the AN DU.

Depending on the leg decision in step 1207, the method may proceed to one or more of the following steps 1208-1210:

If one or more transmission legs in the HN are selected based on the leg decision, step 1208 or/and step 1209 and step 1210 are performed according to the leg decision: the HN CU-UP transmits the PDCP packets and/or the PDCP duplication packets to the HN DU or the AN CU-UP according to the selected leg.

In the above steps 1208-1210, whether to transmit only PDCP packets or to transmit the PDCP packets and the PDCP duplication packets depends on the number of selected transmission legs. For example, if only one transmission leg is selected according to the leg decision, only the PDCP packets are transmitted; if more than one transmission legs are selected, the PDCP packets and the PDCP duplication packets are transmitted.

It should be noted that the sequence of the above steps is only exemplary and is not intended to be limiting. Instead, steps 1201, 1202 and 1203 can change the order or two or more of them can be performed at substantially the same time, step 1206 can be performed before step 1205 or at substantially the same time, and step 1208 can be performed after step 1209 or step 1210 or at substantially the same time.

Figure 13:
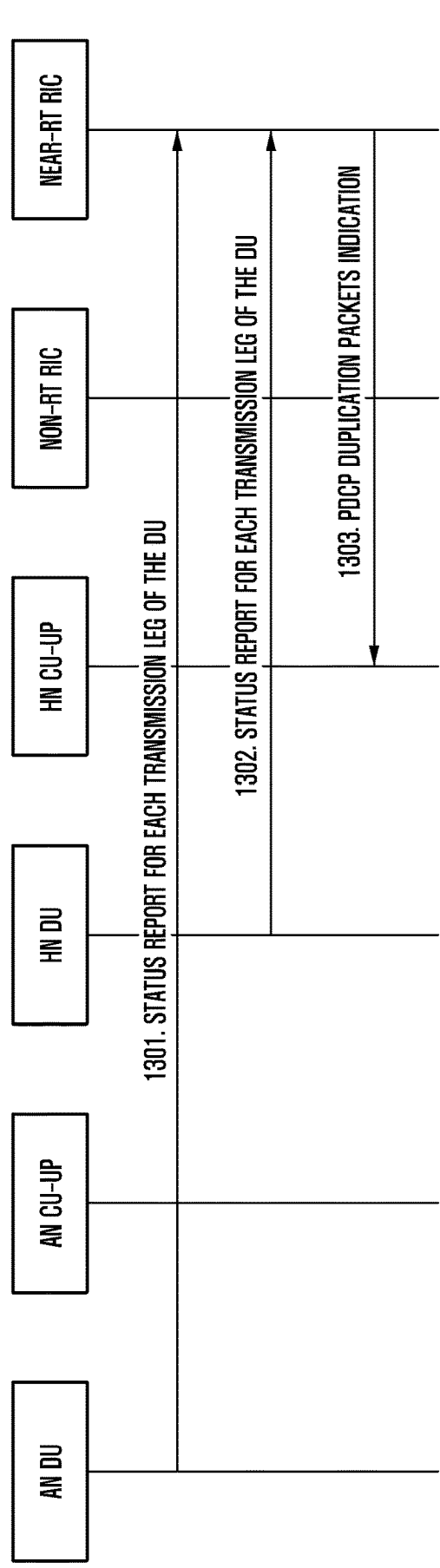
FIG. 13 illustrates a schematic diagram of one aspect of a method for supporting data transmission in a mobile communication network according to an embodiment of the present disclosure.

FIG. 13 illustrates a schematic diagram of one aspect of a method for supporting data transmission in a mobile communication network according to an embodiment of the present disclosure. Specifically, FIG. 13 illustrates that a Near-RT RIC as a decision entity decides whether to activate the PDCP duplication mechanism based on information transmitted by a HN and an AN, in a case where the decision entity and/or a decision training entity are nested in the O-RAN architecture.

As shown in FIG. 13, the method comprises the following steps:

In step 1301, an AN DU transmits a message including a status report for each transmission leg of the AN DU to the Near-RT RIC. In an implementation, for example, the message may be the aforementioned message for reporting the status of the transmission leg (for example, a leg status report (Leg Report)).

In step 1302, a HN DU transmits a message including a status of each transmission leg of the HN DU to the Near-RT RIC. In an implementation, for example, the message may be a leg status (Leg Report).

In step 1303, the Near-RT RIC transmits to the HN CU-UP a message indicating a decision on whether to make PDCP duplication. In an implementation, for example, the message may be the aforementioned message for indicating a PDCP duplication mechanism (e.g., PDCP duplication indication), which is used for the Near-RT RIC to inform the HN CU-UP of the decision on whether to activate the PDCP duplication.

Step 1302 may perform before step 1301, or may be performed at substantially the same time.

Figure 14:
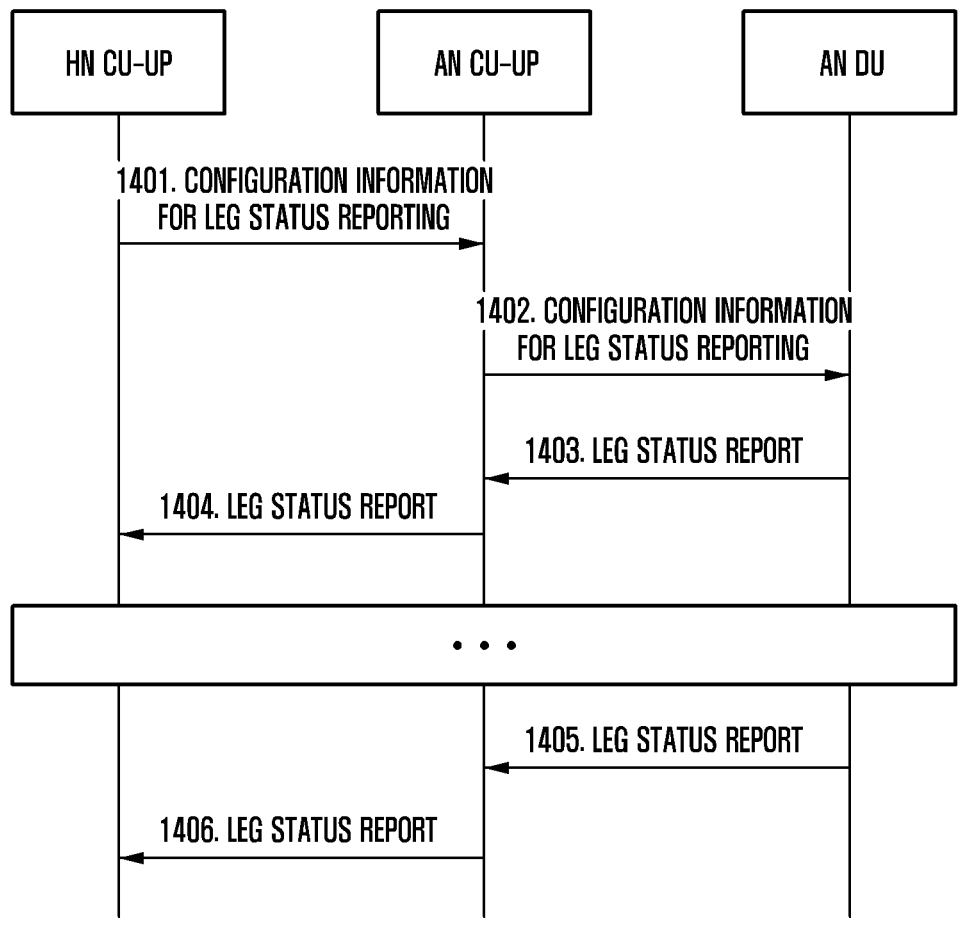
FIG. 14 illustrates a schematic diagram of one aspect of a method for supporting data transmission in a mobile communication network according to an embodiment of the present disclosure.

FIG. 14 illustrates a schematic diagram of one aspect of a method for supporting data transmission in a mobile communication network according to an embodiment of the present disclosure. Specifically, FIG. 14 illustrates that under the split architecture, a leg status report is interacted among an AN DU, an AN CU-UP and a HN CU-UP according to configuration information for leg status reporting.

As shown in FIG. 14, the method comprises the following steps:

In step 1401, the HN CU-UP transmits configuration information for leg status reporting to the AN CU-UP to inform the AN of related information about leg reporting, herein, the configuration information includes at least one of: a type of assistance information required to be reported, a measurement interval, a reporting interval, a start/end indication and a leg identity. Herein, the type of assistance information required to be reported is used to indicate assistance information required to be reported; the measurement interval is used to indicate a value interval of an average value of the assistance information required to be reported; the reporting interval is used to indicate the time interval between two adjacent reporting of the leg status report; the start/end indication is used to indicate to start/stop reporting the leg status report; and the leg identity are used to indicate the leg whose status is required to be included in the status report.

In an implementation, for example, the information may be included in an NR-U information frame, which may be, but is not limited to, DL USER DATA.

In step 1402, the AN CU-UP transmits the configuration information in step 1401 to the AN DU. The AN CU-UP can modify the configuration information according to its own situation. In an implementation, for example, the information may be included in an NR-U information frame, which may be, but is not limited to, DL USER DATA.

In step 1403, the AN DU transmits status report information of each transmission leg to the AN CU-UP. According to configuration requirements in step 1402, the information may include one or more of: a leg identity, an average channel quality index (CQI), average HARQ failure times, average HARQ retransmission times, power headroom reporting, an uplink and/or downlink radio quality identity, an uplink and/or downlink average HARQ failure rate, an uplink and/or downlink average HARQ retransmission rate, an uplink and/or downlink average resource occupancy rate, an uplink/downlink modulation and coding strategy, uplink and/or downlink RLC maximum retransmission times, uplink and/or downlink HARQ maximum retransmission times, and a beam identity.

The acquired information will be directly or indirectly used for training of a decision model or used as an input when the decision model performs leg selection.

In an implementation, for example, the information may be included in an NR-U information frame, which may be, but is not limited to, ASSISSTANCE INFORMATION DATA.

In step 1404, the AN CU-UP transmits information of status report for each transmission leg to the HN CU-UP. This information may be the same as or different from that in step 1403. In an implementation, for example, the message may be an NR-U information frame, which may be ASSISSTANCE INFORMATION DATA.

Herein, if a reporting interval in the assistance information reporting configuration message in step 1401 indicates that it is periodic reporting, the method further proceeds to steps 1405 and 1406, that is, when the reporting period indicated by the reporting interval is met, the second node continues to periodically report the status report for each transmission leg, which is similar to the steps 1403 and 1404, so its details are omitted to avoid obscuring this disclosure.

In addition, if the indication in the assistance information reporting configuration message in step 1401 is aperiodic reporting, the method ends after step 1404.

Figure 15:
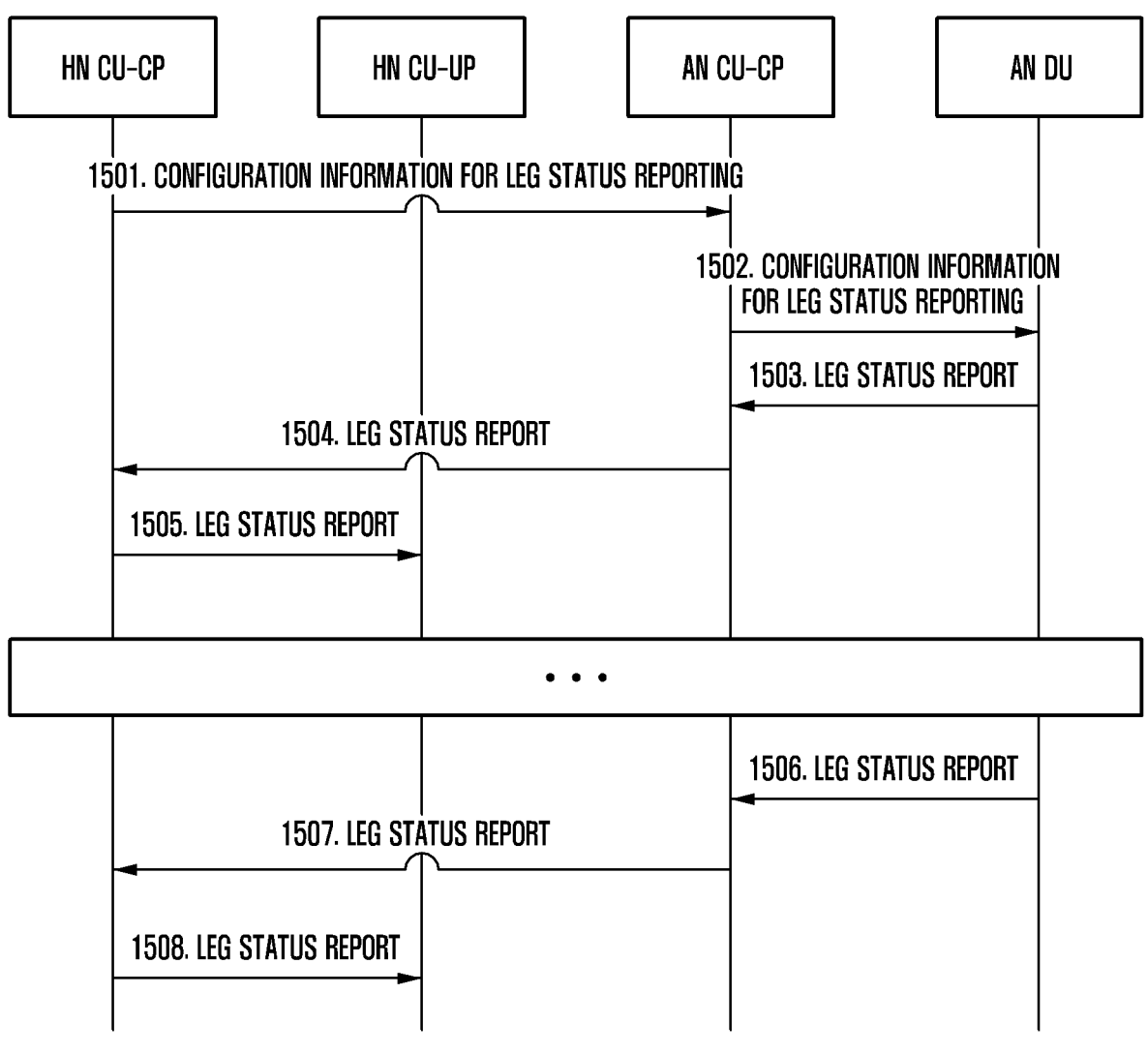
FIG. 15 illustrates a schematic diagram of one aspect of a method for supporting data transmission in a mobile communication network according to an embodiment of the present disclosure.

FIG. 15 illustrates a schematic diagram of one aspect of a method for supporting data transmission in a mobile communication network according to an embodiment of the present disclosure. Specifically, FIG. 15 illustrates that under the separated architecture, a leg status report is interacted among an AN DU, an AN CU-UP, a HN CU-UP and a HN CU-CP.

As shown in FIG. 15, the method comprises the following steps:

In step 1501, the HN CU-CP transmits configuration information for leg status reporting to the AN CU-CP. The configuration information is used to indicate requirements for leg status reporting. The configuration information includes at least one of: a type of assistance information required to be reported, a measurement interval, a reporting interval, a start/end indication and a leg identity. In an implementation, for example, the information may be included in an Xn message, which may be an Xn new message as assistance information reporting configuration message.

In step 1502, the AN CU-CP transmits configuration information for the leg status reporting to the AN DU. This information may be the same as or different from that in step 1501. In an implementation, for example, the information may be an F1 new message as assistance information reporting configuration message.

In step 1503, the AN DU transmits status report for each transmission leg to the AN CU-CP. According to the configuration requirements in step 1502, the report may include one or more of: a leg identity, an average channel quality index (CQI), average HARQ failure times, average HARQ retransmission times, power headroom reporting, an uplink and/or downlink radio quality identity, an uplink and/or downlink average HARQ failure rate, an uplink and/or downlink average HARQ retransmission rate, an uplink and/or downlink average resource occupancy rate, an uplink/downlink MCS, uplink and/or downlink RLC maximum retransmission times, uplink and/or downlink HARQ maximum retransmission times, and a beam identity. In an implementation, for example, the report may be included in an F1 message, which may be a newly defined F1 message, for example, an F1 new message leg status report.

In step 1504, the AN CU-CP transmits status report for each transmission leg of the AN to the HN CU-CP. According to the configuration requirements in step 1501, the report may include one or more of: a leg identity, an average channel quality index (CQI), average HARQ failure times, average HARQ retransmission times, power headroom reporting, an uplink and/or downlink radio quality identity, an uplink and/or downlink average HARQ failure rate, an uplink and/or downlink average HARQ retransmission rate, an uplink and/or downlink average resource occupancy rate, an uplink/downlink MCS, uplink and/or downlink RLC maximum retransmission times, uplink and/or downlink HARQ maximum retransmission times, and a beam identity. In an implementation, for example, the report may be included in an Xn message, which may be a newly defined Xn message, for example, an Xn new message leg status report.

In step 1505, the HN CU-CP transmits status report for each transmission leg of the AN to the HN CU-UP. In an implementation, for example, the report may be included in an E1 message, which may be a newly defined E1 message, for example, an E1 new message leg status report.

Herein, if a reporting interval in the assistance information reporting configuration message in step 1501 indicates periodic reporting, the method further proceeds to steps 1506, 1507 and 1508, that is, when the reporting period indicated by the reporting interval is met, the second node continues to periodically report the status report for each transmission leg, which is similar to the steps 1503, 1504 and 1505, so its details are omitted to avoid obscuring this disclosure.

In addition, if the indication in the assistance information reporting configuration message in step 1501 is aperiodic reporting, the method ends after step 1505.

Figure 16:
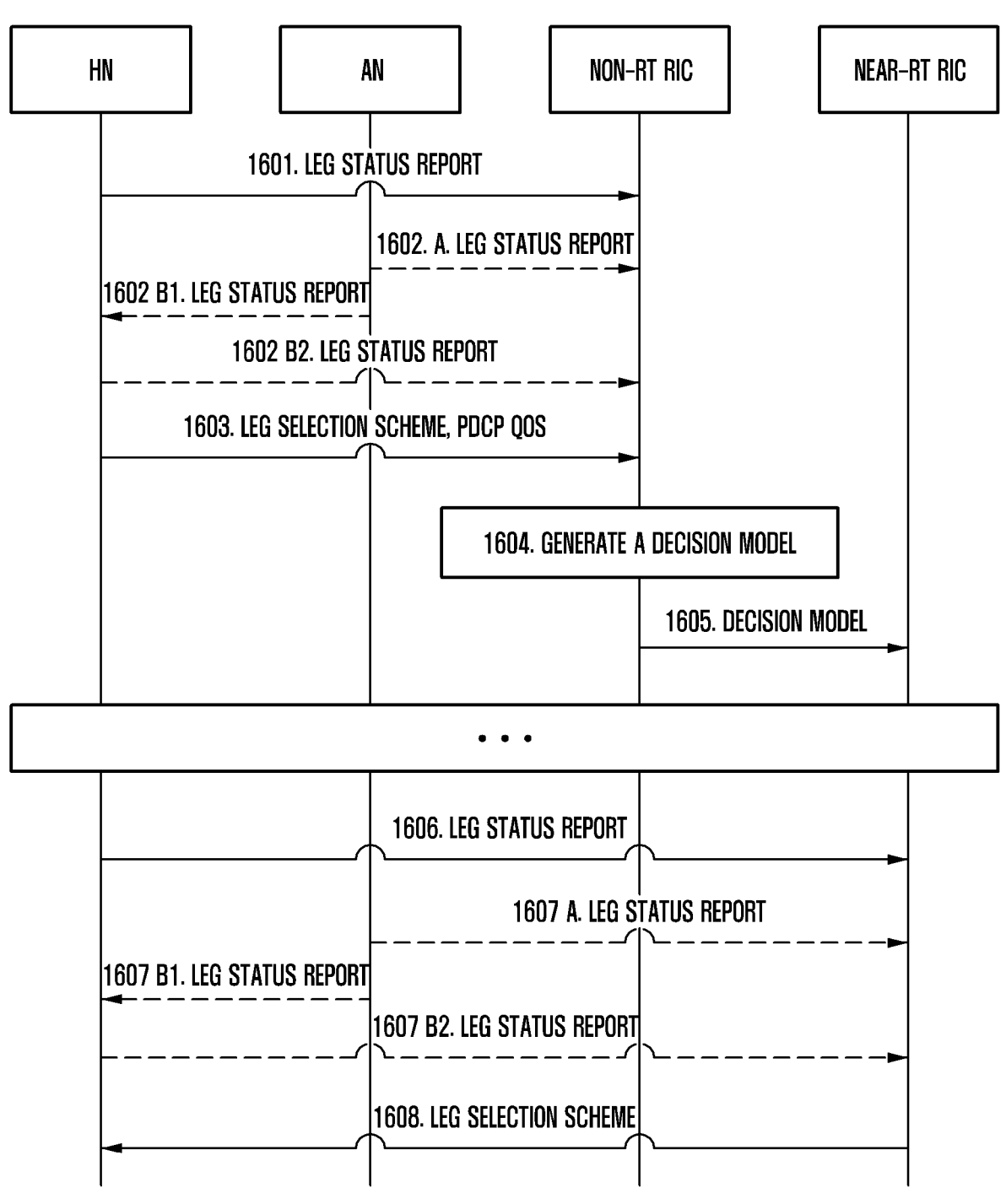
FIG. 16 illustrates a schematic diagram of one aspect of a method for supporting data transmission in a mobile communication network according to an embodiment of the present disclosure.

FIG. 16 illustrates a schematic diagram of one aspect of a method for supporting data transmission in a mobile communication network according to an embodiment of the present disclosure. Specifically, FIG. 16 illustrates that a Non-RT RIC as a decision training entity trains based on information transmitted by a HN and an AN, and a Near-RT RIC as a decision entity performs leg selection based on the information transmitted by the HN and the AN.

As shown in FIG. 16, the method comprises the following steps:

In step 1601, the HN transmits a status report for each transmission leg of the HN to the Non-RT RIC. The report is used as an input to the training of a decision model. In an implementation, for example, the report is included in an O1 message, which may be a newly defined O1 message, such as a leg status report.

In step 1602, the AN transmits a status report for each transmission leg of the AN to the Non-RT RIC. The report is used as an input to the training of a decision model. In an implementation, for example, the report is included in an O1 message, which may be a newly defined O1 message, such as a leg status report.

Alternatively, step 1602 may specifically include steps 1602 B1 and 1602 B2: in step 1602 B1, the AN transmits the status report for each transmission leg in the AN to the HN. The report can be transmitted to the HN through NR-U information frame (which can be, but is not limited to, ASSISSTANCE INFORMATION DATA) or an Xn message, which can be a newly defined Xn message, such as a leg status report. In step 1602 B2, the HN transmits a message including a status report for each transmission leg of the AN and/or the HN to the Non-RT RIC. In an implementation, for example, the report is included in an O1 message, which may be a newly defined O1 message, such as a leg status report.

In step 1603, the HN transmits PDCP QoS information to the Non-RT RIC, which includes, but is not limited to, the identity of the transmission leg currently used by the HN and the current PDCP QoS parameter based on the used transmission leg. The parameter include, but are not limited to, a packet loss rate of PDCP data packets and/or transmission delay of the PDCP data packets between UE and an access node. The information is used as an input to a decision model. In one implementation, for example, the report is included in an O1 message, which may be a newly defined O1 message, such as PDCP QoS information.

In step 1604, the Non-RT RIC generates a decision model based on the leg status information of the HN and the AN and the PDCP QoS information.

In step 1605, the Non-RT RIC transmits the trained decision model to Near-RT RIC with a message. In an implementation, for example, the report is included in an A1 message, which may be a newly defined A1 message, such as a decision model transmission.

Thereafter, the method may proceed to step 1606 and continue as follows:

In step 1606, the HN transmits a message including a status report for each transmission leg of the HN to the Near-RT RIC. The report is used as an input to the decision model for performing leg selection. In an implementation, for example, the report is included in an E2 message, which may be a newly defined E2 message, such as a leg status report.

In step 1607, the AN transmits a status report for each transmission leg of the AN to the Near-RT RIC. The report is used as an input to the decision model for performing leg selection. In an implementation, for example, the report is included in an E2 message, which may be a newly defined E2 message, such as a leg status report. In another implementation, the AN transmits the status of each transmission leg of the AN to the HN through a NR-U information frame (which can be but not limited to ASSISSTANCE INFORMATION DATA) or an Xn message (which can be a newly defined Xn message, such as a leg status report), and the HN transmits the status report for each transmission leg of the AN and/or the HN to the Near-RT RIC. In an implementation, for example, the report is included in an E2 message, which may be a newly defined E2 message, such as a leg status report.

In step 1608, the Near-RT RIC obtains a transmission leg selection strategy by using information in the received message based on the decision model, and transmits the transmission leg selection strategy to the HN with a message. In an implementation, for example, the message is E2, and the E2 message may be a newly defined E2 message, such as a transmission leg selection strategy. The message is used to inform the HN of a leg decision, which may indicate one or more of: legs that should be selected in the HN and/or the AN, and legs that should not be selected in the HN and/or the AN.

It should be noted that the sequence of the above steps is only exemplary and is not intended to be limiting. Instead, step 1601 and step 1602 can be change the order or two or more of them can be performed at substantially the same time, and step 1607 can be performed before step 1606 or at substantially the same time.

Figure 17:
FIG. 17 illustrates a schematic diagram of one aspect of a method for supporting data transmission in a mobile communication network according to an embodiment of the present disclosure.

FIG. 17 illustrates a schematic diagram of one aspect of a method for supporting data transmission in a mobile communication network according to an embodiment of the present disclosure. There are many implementations for this embodiment. For example, in a first implementation, the first node may be an access node or a CU of the access node or a CU-UP of the access node, and the second node may be a different access node or a CU of the different access node, or a CU-UP of the same or different access node or a DU of the same or different access node. In a second implementation, the first node may be an access node or the DU of the access node, and the second node may be UE. In a third implementation, the first node may be an access node or the CU of the access node or the CU-CP of the access node, and the second node may be a different access node or the CU of the different access node or the CU-CP of the different access node.

As shown in FIG. 17, the method comprises the following steps:

In step 1701, a first node transmits a leg selection scheme to a second node. The leg selection scheme may be an uplink and/or downlink leg selection scheme.

In the first implementation, the leg selection scheme may be transmitted in a NR-U information frame. The NR-U information frame may be DL USER DATA or a newly defined NR-U information frame. The representation of the leg selection scheme can be as follows:

2 bits representing the selection result of the current leg, herein, one bit represents whether the uplink selects the current leg, while the other bit represents whether the downlink selects the current leg. Another expression is that one bit represents whether it is uplink or downlink. If 0 represents the uplink, 1 represents the downlink, and vice versa; and the other bit represents whether to select the current leg. If 1 represents to select, 0 represents not to select, and vice versa.

4 bits representing the selection result of the current leg, herein, 2 bits represent the uplink and 2 bits represent the downlink. In the 2 bits representing uplink or downlink, one bit represents whether to select the current leg. If 1 represents to select, 0 represents not to select, and vice versa. The other bit represents whether the aforementioned bit information is valid, for which 1 represents valid, 0 represents invalid, or vice versa. If this bit indicates that the aforementioned bit is invalid, the content of the aforementioned bit should be ignored.

2*N bits representing the selection results of N legs, of which 2 bits represent one leg. The 2-bit representation method can be the same as the 2-bit representation of the current leg selection result.

In the second implementation, the leg selection scheme may be transmitted in a MAC message or an RRC message. The MAC message may be MAC CE. The leg selection scheme includes one or more of the following information:

A DRB ID, which is an identity of a DRB using PDCP duplication function of the UE.

A transmission direction indication, indicating whether the indicated leg is an uplink leg or a downlink leg. The transmission direction indication can be expressed by 1 bit, for example, this bit being 1 represents an uplink leg, and this bit being 0 represents a downlink leg; or this bit being 0 represents an uplink leg, and this bit being 1 represents a downlink leg.

a specific leg selection scheme, which can be represented by the identity of the selected leg, or can be represented by an identity, a value of which represents a corresponding leg selection scheme, or all possible legs are arranged in a predetermined way, and for each leg, 1 bit is used to represent whether the leg is selected or not. Illustrate the last expression way for example. For example, a total of three legs can be used for the downlink legs of PDCP duplication, the leg indexes of which are 1, 2, and 3, respectively, and it is agreed by the implementation that all legs are arranged in ascending order of the indexes, and the first leg is selected, which is represented as 1, while the other two legs are not selected, which is represented as 0, then the leg selection scheme is represented by 3 bits and the value is binary 100.

In the third implementation mode, the leg selection scheme may be transmitted in an Xn interface message, an X2 interface message, an E1 interface message or an F1 interface message. The information contained in the leg selection scheme is the same as the first implementation or the second implementation of this embodiment.

According to this embodiment, the access node may inform the UE of the uplink and/or downlink leg selection scheme. In this way, after the UE knows the downlink leg selection scheme, it does not need to monitor whether there is downlink data on all possible downlink legs, thus achieving the purpose of saving energy for the UE; after the UE knows the uplink leg selection scheme, it can perform uplink data transmission on the selected leg.

Figure 18:
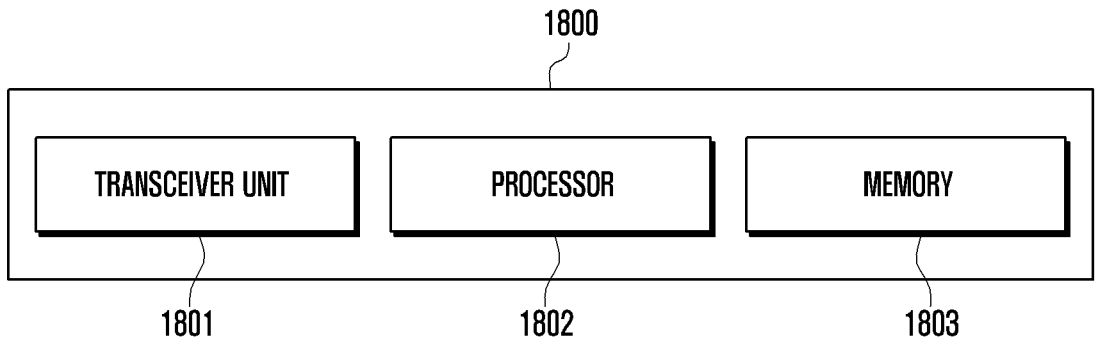
FIG. 18 illustrates a simplified block diagram of an example configuration of hardware components of a device for supporting data transmission according to various embodiments of the present disclosure.

FIG. 18 illustrates a simplified block diagram of an example configuration of hardware components of a device of supporting data transmission according to various embodiments of the present disclosure. The device may implement the method for supporting data transmission according to various embodiments of the present disclosure.

The device 1800 can be implemented in any device that can perform relevant steps in the method for supporting data transmission according to the present disclosure. As a non-limiting example, the device 1800 can be implemented in network nodes such as base stations or core networks, etc., or components of devices such as base stations or core networks, or can be implemented in any similar devices.

As shown in FIG. 18, the device 1800 includes a transceiver unit 1801, a processor 1802 and a memory 1803.

The transceiver unit 1801 is configured to receive and/or transmit signals.

The processor 1802 is operatively connected to the transceiver unit 1801 and the memory 1803. The processor 1802 may be implemented as one or more processors, and is used to operate according to one or more aspects of the method for supporting data transmission described in various embodiments of the present disclosure.

The memory 1803 is configured to store data. The memory 1803 may include a non-transitory memory for storing operations and/or code instructions executable by the processor 1802. The memory 1803 may include processor readable non-transitory instructions that, when executed, cause the processor 1802 to implement the steps of the method for supporting data transmission according to various embodiments of the present disclosure. The memory 1803 may also include random access memory or cache(s) to store intermediate processing data from various functions performed by the processor 1802.

Those of ordinary skill in the art will recognize that the description of the method for supporting data transmission and device is illustrative only and is not intended to be limiting in any way. Other embodiments will readily occur to those of ordinary skill in the art having the benefit of this disclosure. Any modification, equivalent substitution, improvement, etc., made within the spirit and principle of this disclosure shall be included in the scope of protection of this disclosure.

The invention claimed is:

1. A method performed by a first node establishing connection with a user equipment (UE) for supporting data transmission in a wireless communication system, the method comprising:

transmitting, to a second node, configuration information for reporting a status of a transmission leg;

receiving, from the second node, information on a leg status report in response to the configuration information;

transmitting, to a third node of a radio access network (RAN), a first message including at least one of first information for reporting status of one or more transmission legs of the first node or second information for reporting status of one or more transmission legs of the second node;

transmitting, to the third node, a second message including a leg identity and a quality of service (QoS) parameter; and receiving, from the third node, a third message including information on transmission leg selection, wherein the information on the leg status report includes information on an average channel quality indicator (CQI), information a hybrid automatic repeat request (HARQ) failure time, and information on HARQ retransmission, and wherein the first node corresponds to a hosting node and the second node corresponds to an assisting node.

2. The method of claim 1, wherein the second information is obtained based on the information on the leg status report.

3. The method of claim 1, wherein the configuration information includes at least one of: a service type, a measurement interval, a reporting period, an indication indicating to start or to stop transmission of assistance information, a type of assistance information required to be reported, or a leg identity.

4. A method performed by a third node for supporting data transmission in a wireless communication system, the method comprising:

receiving, from a first node establishing connection with a user equipment (UE), a first message including at least one of first information for reporting status of one or more transmission legs of the first node or second information for reporting status of one or more transmission legs of a second node;

receiving, from the first node, a second message including a leg identity and a quality of service (QoS) parameter; and transmitting, to the first node, a third message including information on transmission leg selection based on the second message, wherein the information on transmission leg selection is obtained based on the first message and the second message, wherein each of the first information and the second information includes information on an average channel quality indicator (CQI), information a hybrid automatic repeat request (HARQ) failure time, and information on HARQ retransmission, and wherein the first node corresponds to a hosting node and the second node corresponds to an assisting node.

5. The method of claim 4, wherein the method further comprises:

wherein configuration information for reporting a status of a transmission leg is transmitted from the first node to the second node, wherein information on a leg status report is transmitted from the second node to the first node based on the configuration information, and wherein the configuration information includes at least one of: a service type, a measurement interval, a reporting period, an indication indicating to start or to stop transmission of assistance information, a type of assistance information required to be reported, or a leg identity.

6. A first node establishing connection with a user equipment (UE) for supporting data transmission in a wireless communication system, the first node comprising:

at least one transceiver;

at least one processor communicatively coupled to the at least one transceiver; and at least one memory, communicatively coupled to the at least one processor, storing instructions executable by the at least one processor individually or in any combination to cause the first node to:

transmit, to a second node, configuration information for reporting a status of a transmission leg, receive, from the second node, information on a leg status report in response to the configuration information, transmit, to a third node of a radio access network (RAN), a first message including at least one of first information for reporting status of one or more transmission legs of the first node or second information for reporting status of one or more transmission legs of the second node, transmit, to the third node, a second message including a leg identity and a quality of service (QoS) parameter, and receive, from the third node, a third message including information on transmission leg selection, wherein the information on the leg status report includes information on an average channel quality indicator (CQI), information a hybrid automatic repeat request (HARQ) failure time, and information on HARQ retransmission, and wherein the first node corresponds to a hosting node and the second node corresponds to an assisting node.

7. The first node of claim 6, wherein the second information is obtained based on the information on the leg status report.

8. The first node of claim 6, wherein the configuration information includes at least one of: a service type, a measurement interval, a reporting period, an indication indicating to start or to stop transmission of assistance information, a type of assistance information required to be reported, or a leg identity.

9. A third node for supporting data transmission in a wireless communication system, the third node comprising:

at least one transceiver;

at least one processor communicatively coupled to the at least one transceiver; and at least one memory, communicatively coupled to the at least one processor, storing instructions executable by the at least one processor individually or in any combination to cause the third node to:

receive, from a first node establishing connection with a user equipment (UE), a first message including at least one of first information for reporting status of one or more transmission legs of the first node or second information for reporting status of one or more transmission legs of a second node, receive, from the first node, a second message including a leg identity and a quality of service (QoS) parameter, and transmit, to the first node, a third message including information on transmission leg selection based on the second message, wherein the information on the transmission leg selection is obtained based on the first message and the second message, wherein each of the first information and the second information includes information on an average channel quality indicator (CQI), information a hybrid automatic repeat request (HARQ) failure time, and information on HARQ retransmission, and wherein the first node corresponds to a hosting node and the second node corresponds to an assisting node.

10. The third node of claim 9, wherein configuration information for reporting a status of a transmission leg is transmitted from the first node to the second node, and wherein information on a leg status report is transmitted from the second node to the first node based on the configuration information.

11. The third node of claim 10, wherein the configuration information includes at least one of: a service type, a measurement interval, a reporting period, an indication indicating to start or to stop transmission of assistance information, a type of assistance information required to be reported, or a leg identity.

* * * * *